United States Patent
Quinn

(10) Patent No.: US 7,631,584 B2
(45) Date of Patent: Dec. 15, 2009

(54) TOOL ADAPTOR FOR USE WITH A RECIPROCATING SAW

(75) Inventor: Timothy Don Quinn, Logansport, IN (US)

(73) Assignee: Quinn Tools, Inc., Logansport, IN (US)

( * ) Notice: Subject to any disclaimer, the term of this patent is extended or adjusted under 35 U.S.C. 154(b) by 457 days.

(21) Appl. No.: 11/297,731

(22) Filed: Dec. 8, 2005

(65) Prior Publication Data

US 2006/0086218 A1    Apr. 27, 2006

Related U.S. Application Data

(63) Continuation-in-part of application No. 10/941,345, filed on Sep. 15, 2004.

(60) Provisional application No. 60/552,931, filed on Mar. 12, 2004.

(51) Int. Cl.
    *B26D 1/00*     (2006.01)

(52) U.S. Cl. .................. 83/13; 83/698.11; 83/698.71; 30/209; 30/329

(58) Field of Classification Search ............ 83/698.11, 83/698.71–699.61; 279/145, 904, 143, 144; 30/209, 329, 335, 337, 339, 349, 241
See application file for complete search history.

(56) References Cited

U.S. PATENT DOCUMENTS

| | | | |
|---|---|---|---|
| 68,584 A | 9/1867 | Weed | |
| 121,223 A | 11/1871 | Ward | |
| 1,414,449 A | 5/1922 | Witzig | |
| 1,462,556 A | 7/1923 | Kropp | |
| 1,934,962 A | 11/1933 | Barry | |
| 2,197,626 A | 4/1940 | Scheven | |
| 2,735,685 A * | 2/1956 | Karr | 279/44 |
| 2,954,808 A | 10/1960 | Sweeney et al. | |
| 2,991,085 A | 7/1961 | Lyon | |
| 3,023,015 A * | 2/1962 | Pankow | 279/14 |
| 3,557,419 A | 1/1971 | Flannery | |
| 3,867,747 A | 2/1975 | Lee | |
| 4,083,112 A * | 4/1978 | Palm | 30/335 |
| 4,133,545 A | 1/1979 | Komori | |
| 4,345,499 A | 8/1982 | Ross | |
| 4,365,397 A | 12/1982 | Felpel | |
| 4,381,604 A | 5/1983 | Horst | |
| 4,790,045 A | 12/1988 | Doherty | |
| 4,848,037 A | 7/1989 | Happe | |
| 5,058,273 A | 10/1991 | Streger | |
| 5,311,654 A * | 5/1994 | Cook | 29/447 |
| 5,421,232 A | 6/1995 | Laverick | |
| 5,569,282 A * | 10/1996 | Werner | 606/167 |

(Continued)

*Primary Examiner*—Boyer D Ashley
*Assistant Examiner*—Omar Flores-Sánchez
(74) *Attorney, Agent, or Firm*—Barnes & Thornburg

(57) ABSTRACT

A tool adaptor for use with a reciprocating saw includes a first end configured to be coupled with the reciprocating saw and a second end configured to be coupled with a tool. The tool adaptor also includes an elongated portion defined between the first end and the second end. The tool includes a coupler configured to be coupled with the second end. The tool also includes a tool device. The tool device may be a scraper, a saw, a grout saw, a file, a wire brush, a cultivator, or other type of tool device. The tool may also include a keyless chuck. The tool adaptor and tool may form a unitary construction.

20 Claims, 17 Drawing Sheets

U.S. PATENT DOCUMENTS

| | | |
|---|---|---|
| 5,575,071 A | 11/1996 | Phillips et al. |
| 6,264,211 B1 * | 7/2001 | Granado ............... 279/143 |
| 6,550,147 B1 | 4/2003 | Fishlock et al. |
| 6,739,059 B2 * | 5/2004 | Bollinger et al. ........... 30/277.4 |
| 6,751,875 B2 | 6/2004 | Jones |
| 6,754,967 B2 | 6/2004 | Lovell et al. |
| 6,755,424 B1 | 6/2004 | Paulsen |
| 6,862,968 B1 | 3/2005 | Ogston |
| 6,871,405 B2 | 3/2005 | Reale et al. |
| 2003/0177646 A1 | 9/2003 | Watanabe |

* cited by examiner

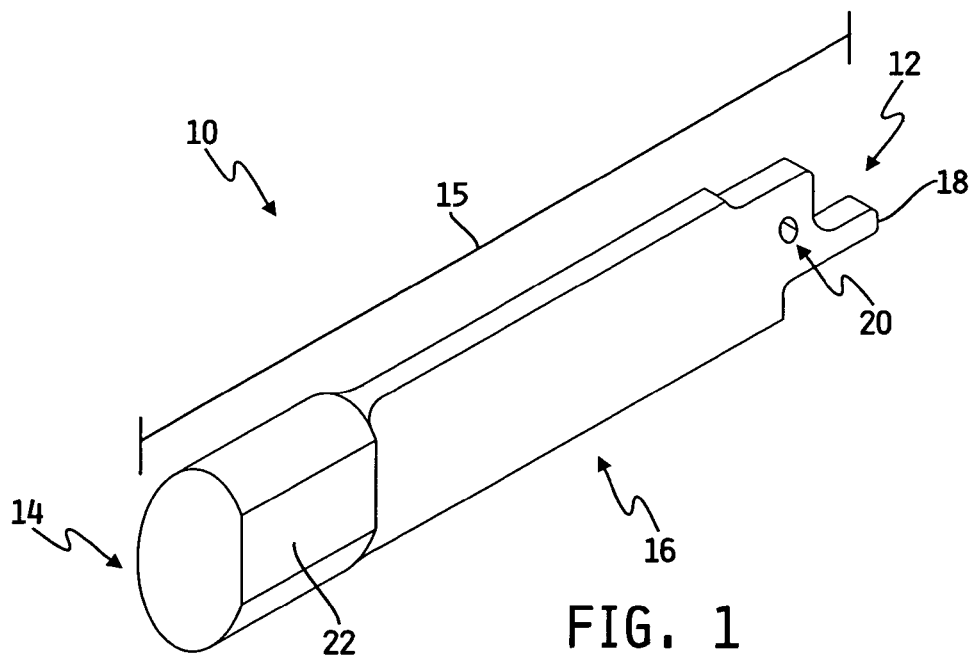
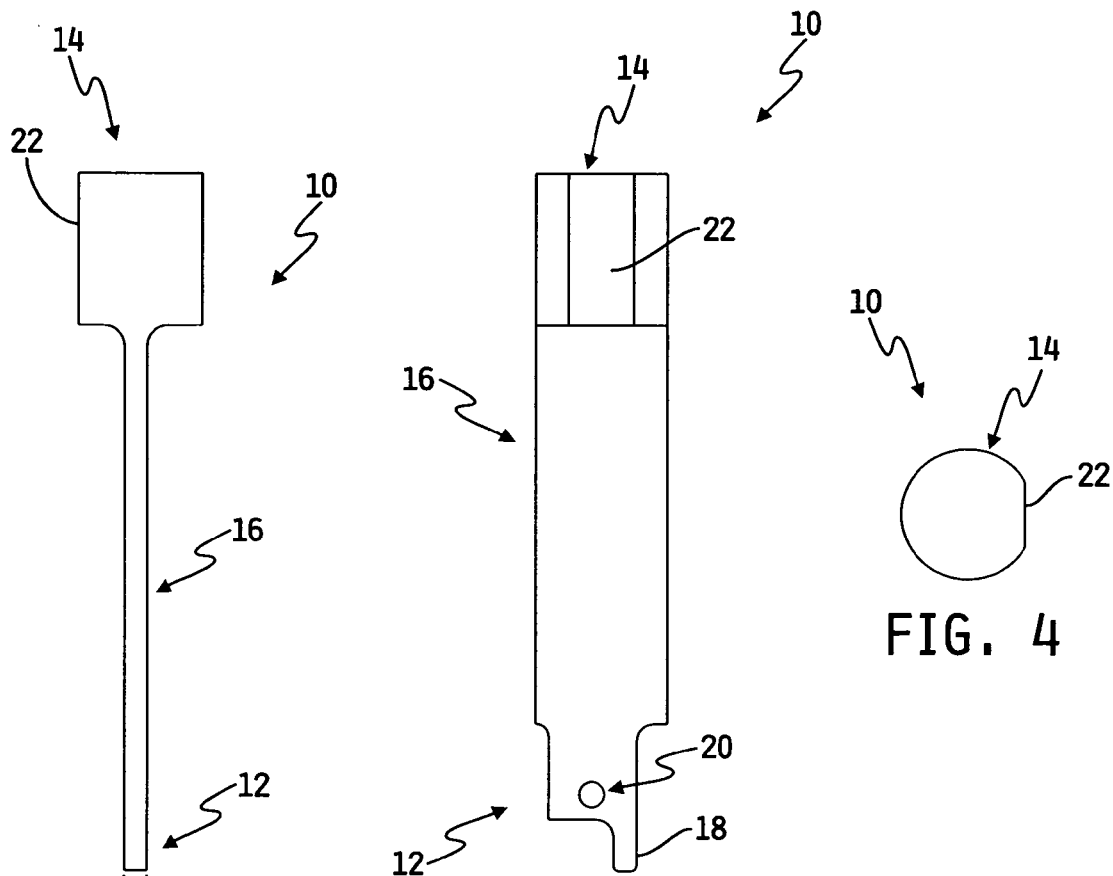

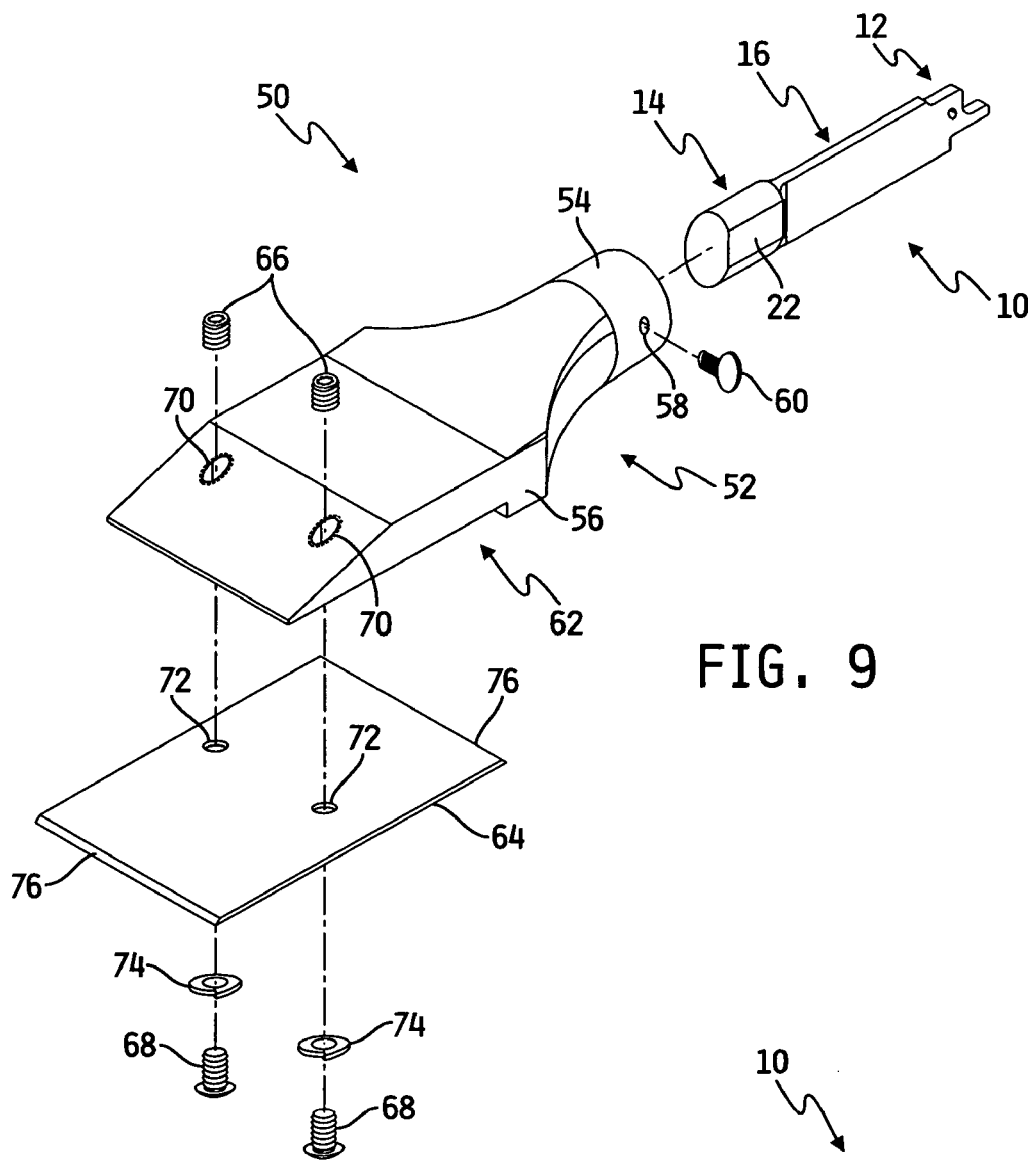
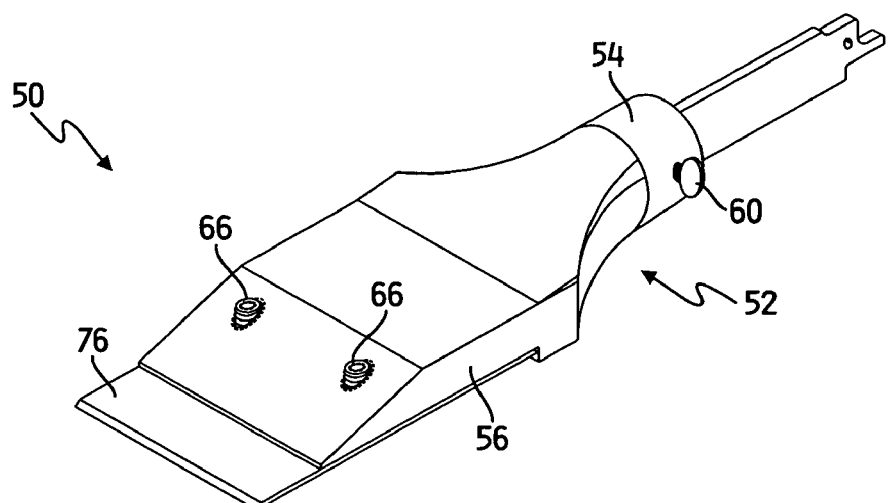

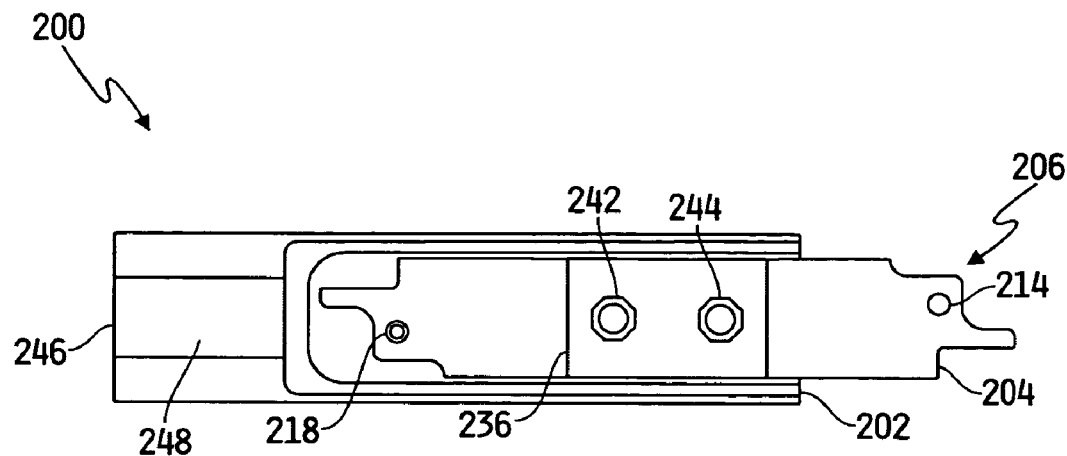
FIG. 22
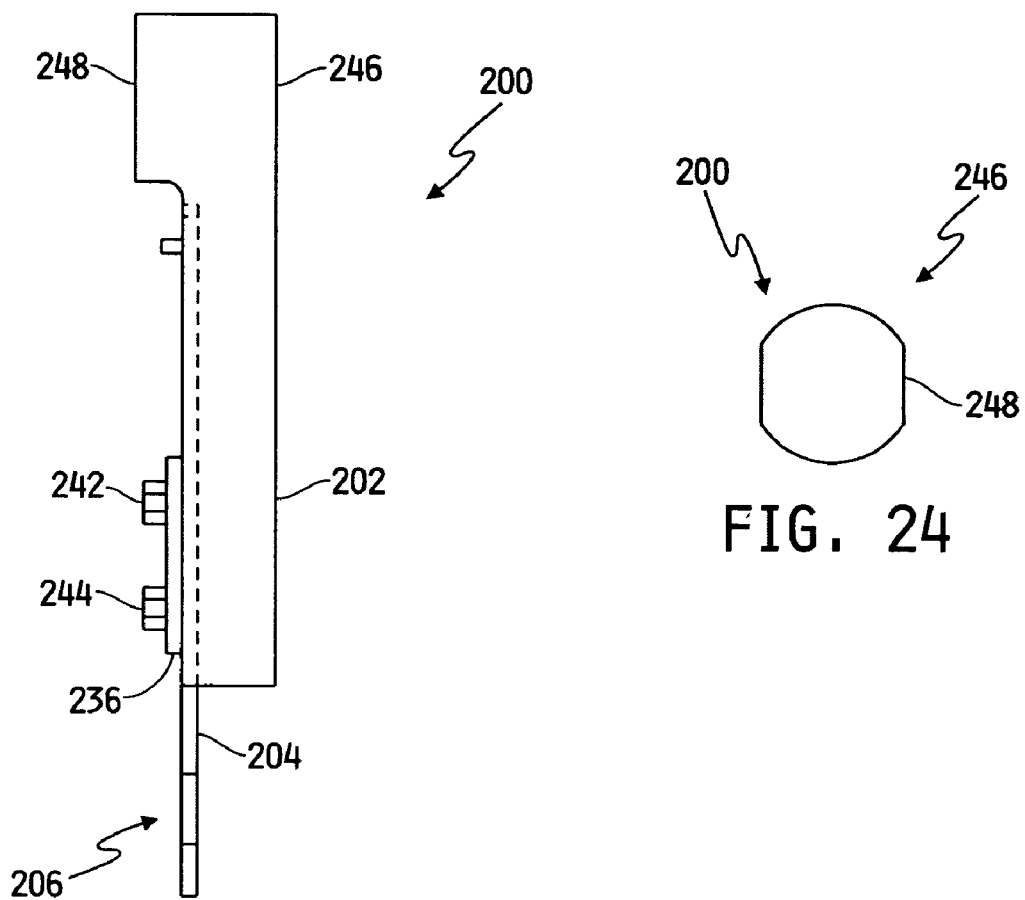
FIG. 24
FIG. 23

TOOL ADAPTOR FOR USE WITH A RECIPROCATING SAW

This application is a continuation-in-part of co-pending U.S. Non-Provisional application Ser. No. 10/941,345, filed on Sep. 15, 2004, which claims priority to U.S. Provisional Application Ser. No. 60/552,931, filed on Mar. 12, 2004. Each of these applications are hereby incorporated by reference herein.

BACKGROUND OF THE DISCLOSURE

The present disclosure relates generally to reciprocating saws. More particularly, the present disclosure relates to tools for use with reciprocating saws.

Reciprocating saws are used by carpenters, builders, and other users to cut wood, metal, plastic, and other types of materials and structures. The generally elongated design of reciprocating saws allows such saws to be used in areas wherein other types of saws, such as circular saws, may be too cumbersome. In use, a user couples a reciprocating saw blade to a saw blade receiver of the reciprocating saw. The user may operate the reciprocating saw to cause the saw blade to be reciprocated or moved in a back and forth motion. Unlike manual saws, the automated reciprocation of the saw blade causes the saw blade to saw or cut materials with little manual sawing motion from the user.

Other tools, such as scrapers and files, also use a reciprocating motion to perform their tool function. However, such tools must be manually operated by moving the tool in a back and forth motion. Repetitive operation of such tools may be difficult in some areas and may cause strain on the operator over time.

SUMMARY OF THE DISCLOSURE

The present invention comprises one or more of the features recited in the appended claims and/or the following features which, alone or in any combination, may comprise patentable subject matter:

An adaptor for use with a reciprocating saw is provided. The adaptor may include a first end and a second end opposite the first end. The adaptor may also include an elongated portion defined between the first end and the second end. The elongated portion may have a substantially rectangular cross-section or may otherwise be configured to be reciprocated through a guard of the reciprocating saw while the saw is being operated by a user. The first end may be configured to be coupled with the reciprocating saw. The first end may include a longitudinally extending protrusion and may also include an aperture configured to receive a guide pin of the reciprocating saw. The second end may be configured to be coupled with a tool. The second end may have a substantially elliptical or ovate cross-section and may include at least one coupling surface configured to be contacted by a securing device of a tool. The coupling surface may include a longitudinally extending, substantially flat surface. The second end may also include a biased detent or protrusion. The tool may include a coupler configured to couple with the second end. The tool may have a securing device such as a thumb screw or set screw to secure the tool to the adaptor. The tool may also include a tool device such as a scraper, a saw, a grout saw, a wire brush, a file, a cultivator, or other type of tool device. Additionally, the tool may include a keyless chuck. Further, the tool may include a middle elongated portion that extends at an angle, such as a 45 degree angle, away from a longitudinal axis defined by the elongated portion.

An apparatus for use with a reciprocating saw is also provided. The apparatus may include an adaptor. The adaptor may include a first end configured to be coupled with a reciprocating saw blade receiver of the reciprocating saw. The first end of the adaptor may include a longitudinally extending protrusion and may also include aperture configured to receive a guide pin of the reciprocating saw. The adaptor may also include an elongated portion. The elongated portion of the adaptor may be configured to reciprocate through a guard of the reciprocating saw while the reciprocating saw is operated by a user. The apparatus may also include a tool and a coupler. The coupler may removedly couple the tool to the adaptor. The tool may include a middle elongated portion that extends away from the coupler at an angle, such as a 45 degree angle, from a longitudinal axis defined by the adaptor. The tool may also include a scraper, a saw, a grout saw, a file, a wire brush, a cultivator or other type of tool or tool device. The coupler may be configured to receive a second end of the adaptor.

A tool adaptor for use with a reciprocating saw is also provided. The tool adaptor may include a first end configured to be coupled to the reciprocating saw. The first end may include a longitudinally extending protrusion and/or an aperture. The aperture may be configured to receive a guide pin of the reciprocating saw. The tool adaptor may also include a second end configured to be coupled with a tool. The second end may include one or more coupling surfaces. The coupling surfaces may be configured to be contacted by a securing device of the tool. The tool adaptor may further include an elongated portion defined between the first end and the second end. The elongated portion may have a substantially rectangular cross-section. The elongated portion may be configured to be reciprocated through a guard of the reciprocating saw. The tool may include a scraper, a saw, a grout saw, a file, a wire brush, a cultivator, or other type of tool or tool device.

A reciprocating saw is also provided. The reciprocating saw may include a reciprocating saw blade receiver. The saw may also include an adaptor. The adaptor may include a first end configured to be coupled with the reciprocating saw blade receiver. The adaptor may also include a second end opposite the first end. The reciprocating saw may further include a tool. The tool may include a coupler configured to be coupled with the second end of the adaptor. The tool may include a scraper, a saw, a grout saw, a file, a wire brush, a cultivator, or other type of tool device.

The above and other features of the present disclosure, which alone or in any combination may comprise patentable subject matter, will become apparent from the following description and the attached drawings.

BRIEF DESCRIPTION OF THE DRAWINGS

The detailed description particularly refers to the following figures, in which:

FIG. 3 is a side elevation view of the adaptor of FIG. 1;

FIG. 4 is an end elevation view of the second end of the adaptor of FIG. 1;

FIG. 9 is an exploded perspective view of the adaptor of FIG. 1 and a scrapper tool configured to be coupled with the adaptor;

FIG. 10 is a perspective view of the scrapper tool of FIG. 9 coupled with the adaptor of FIG. 1;

FIG. 22 is a side elevation view of the tool adaptor of FIG. 21;

FIG. 23 is a plan view of the tool adaptor of FIG. 21;

FIG. 24 is a end elevation view of the tool adaptor of FIG. 21; and

DETAILED DESCRIPTION OF THE DRAWINGS

Figure 1:
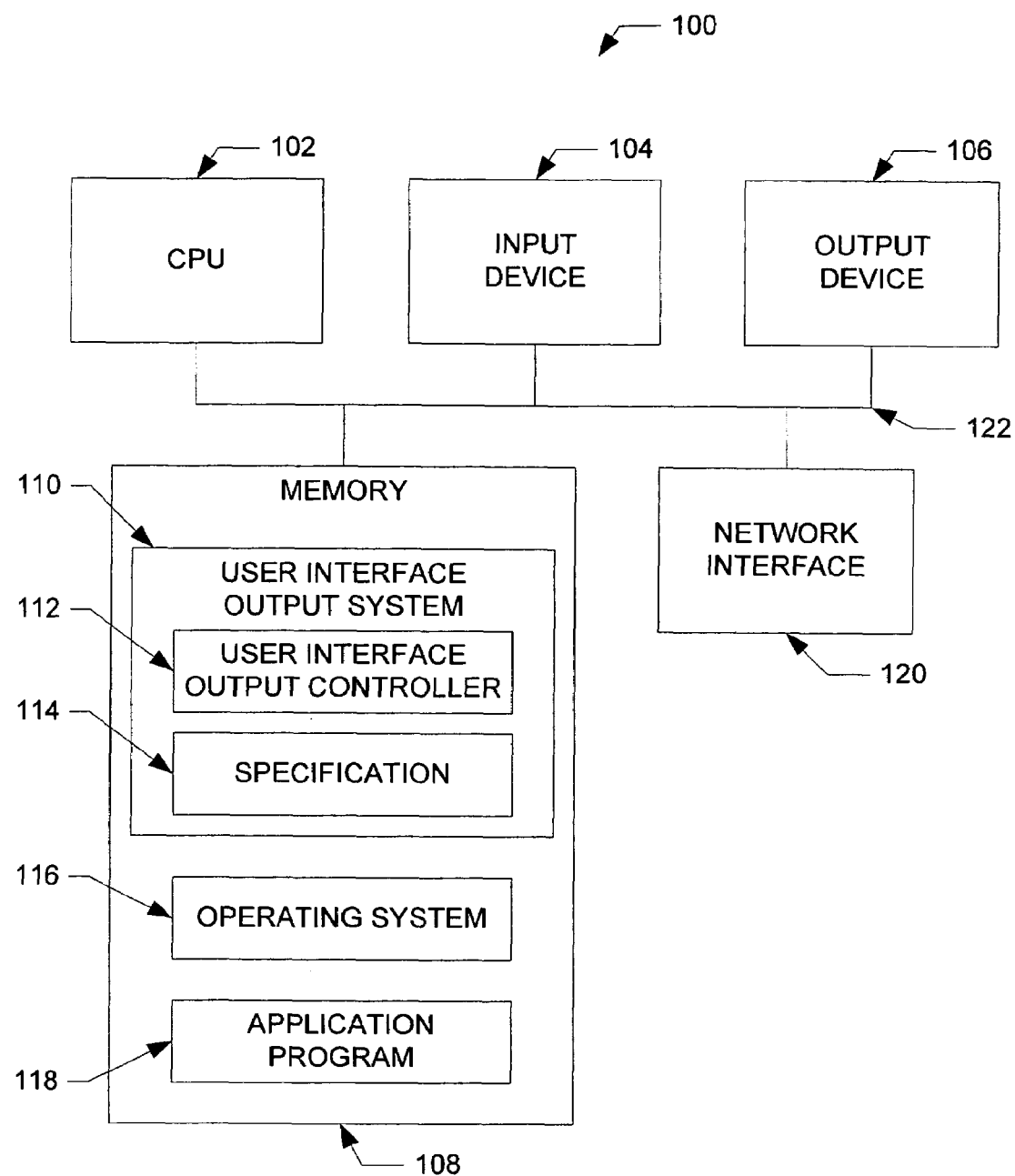
FIG. 1 is a perspective view of a tool adaptor for use with a reciprocating saw and having a first end configured to be coupled to the saw and a second end configured to be coupled with a tool.
Figure 2:
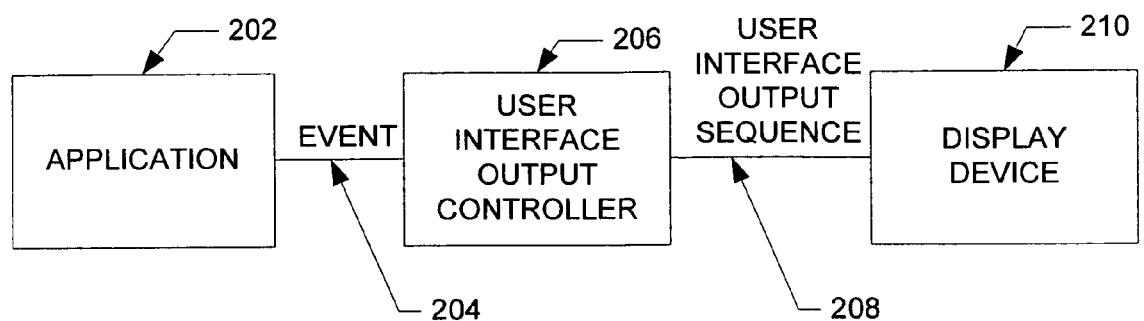
FIG. 2 is a plan view of the adaptor of FIG. 1.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure.

Referring to FIGS. 1-4, a tool adaptor 10 has a first end 12, a second end 14, and an elongated portion 16 defined between the first end 12 and the second end 14. The first end 12 is configured to be received by a reciprocating saw. For example, the first end 12 may be similar to a mounting end of a typical reciprocating saw blade commonly used with the reciprocating saw. The illustrative first end 12 includes a protrusion 18 that extends longitudinally relative to the elongated portion 12 and an aperture 20 configured to receive a guide pin of the reciprocating saw when the adaptor is coupled to the reciprocating saw as discussed below in regard to FIGS. 7 and 8. However, in other embodiments, the first end 12 may have other configurations and/or elements based on the type, model, and other criteria related to the reciprocating saw to which the adaptor 10 is to be coupled.

The second end 14 of the adaptor 10 is configured to couple with a tool such as a scraper, file, saw, brush, cultivator, or any other type of tool generally operated with a reciprocating motion and configured to be coupled with the second end 14. The illustrative second end 14 has a substantially elliptical cross-section as illustrated in FIG. 4. In one particular embodiment, the second end 16 has a substantially circular cross-section. However, in other embodiments, the second end 16 may have any other cross-sectional shape including, but not limited to, an ovate, square, round, triangular, diamond, polygonal, and any other geometrical or other shape allowing the adaptor to be coupled with the tool. The second end 14 of the adaptor 10 illustrated in FIG. 1 includes a securing surface 22 extending longitudinally relative to the elongated portion 12. The securing surface 22 is configured to be contacted by a securing device, such as a screw, bolt, or other type of securing device, of the tool to secure the tool to the adaptor 10.

In other embodiments, the second end 14 may include other elements, configurations, or devices for coupling the adaptor 10 with the tool. For example, in some alternative embodiments, the second end 14 may include a receiving aperture for receiving a portion of the tool and securing devices to secure the adaptor to the tool. In one particular alternative embodiment illustrated in FIG. 5, the second end 14 includes a detent 24 located on the surface 22. The detent 24 may be biased, such as by a spring or other biasing member, to an outward position. In such embodiments, tools for use with the adaptor 10 include an aperture or indention for receiving a portion of the detent 24 when the adaptor 10 is coupled with the tool. The detent 24 allows the tool to be quickly coupled and decoupled with the adaptor 10. To couple the tool to the adaptor 10, the second end 14 of the adaptor 10 is positioned into a coupler of the tool. The detent 24 is pushed or biased inward until the detent 24 and the aperture of the tool cooperate to couple the tool with the adaptor.

Figure 5:
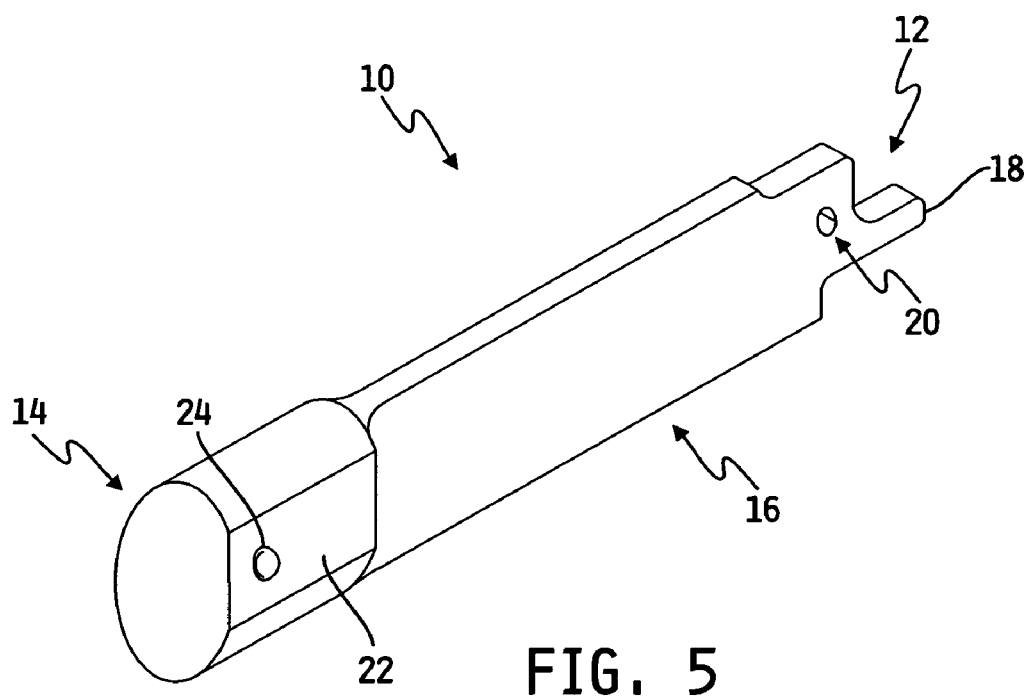
FIG. 5 is a tool adaptor similar to the tool adaptor of FIG. 1 and having a second end including a biased detent.
Figure 6:
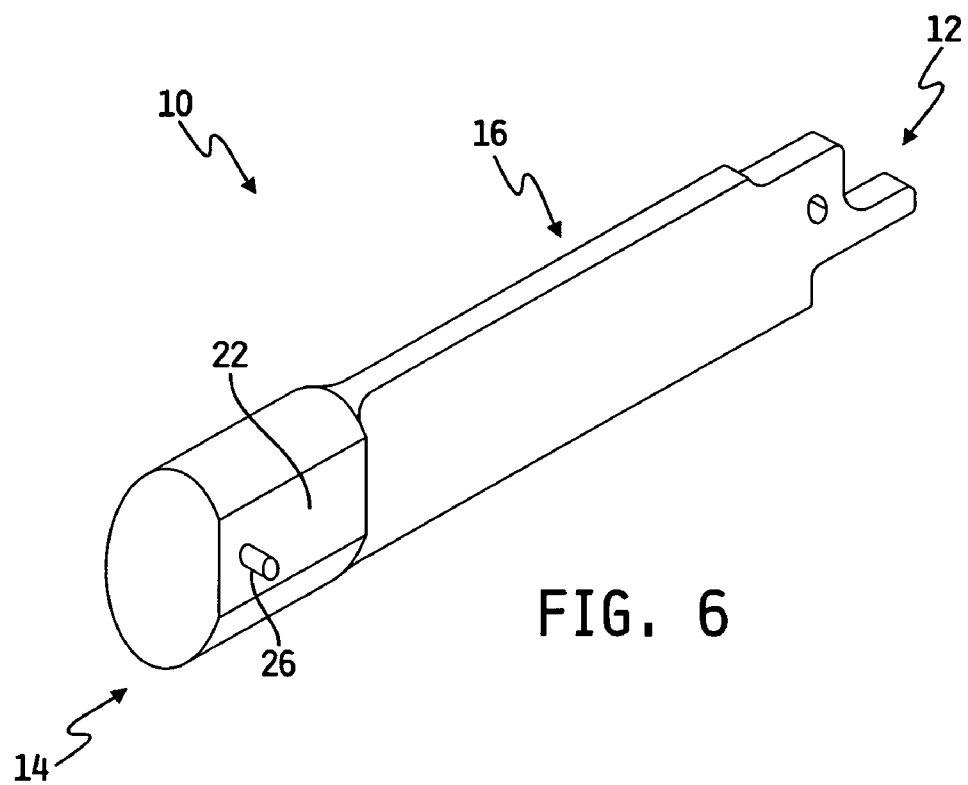
FIG. 6 is a tool adaptor similar to the tool adaptor of FIG. 1 and having a second end including a protrusion.

Alternatively, in another embodiment illustrated in FIG. 6, the adaptor 10 includes a protrusion 26 located on the surface 22. The protrusion 26 extends from the surface 22 at a substantially right angle, but in other embodiments, may extend at any other angle from the surface 22. Tools for use with the adaptor 10 illustrated in FIG. 6 include a slot configured to receive the protrusion 26. To couple the tool to the adaptor 10, the second end 14 of the adaptor 10 is positioned into a coupler of the tool by aligning the protrusion 26 with the slot of the tool. Once the tool is coupled to the adaptor 10, the tool may be turned or rotated to lock or otherwise secure the tool to the adaptor 10. When the tool is rotated, the protrusion cooperates with a locking slot of the tool to inhibit the decoupling of the tool from the adaptor 10 without the rotation of the tool. The tools for use with the adaptor 10 illustrated in FIGS. 5 and 6, may also include other securing devices, such as a screw, bolt, or the like, to secure the tool with the adaptor after the tool has been coupled to the adaptor as discussed above in regard to FIG. 1.

Figure 7:
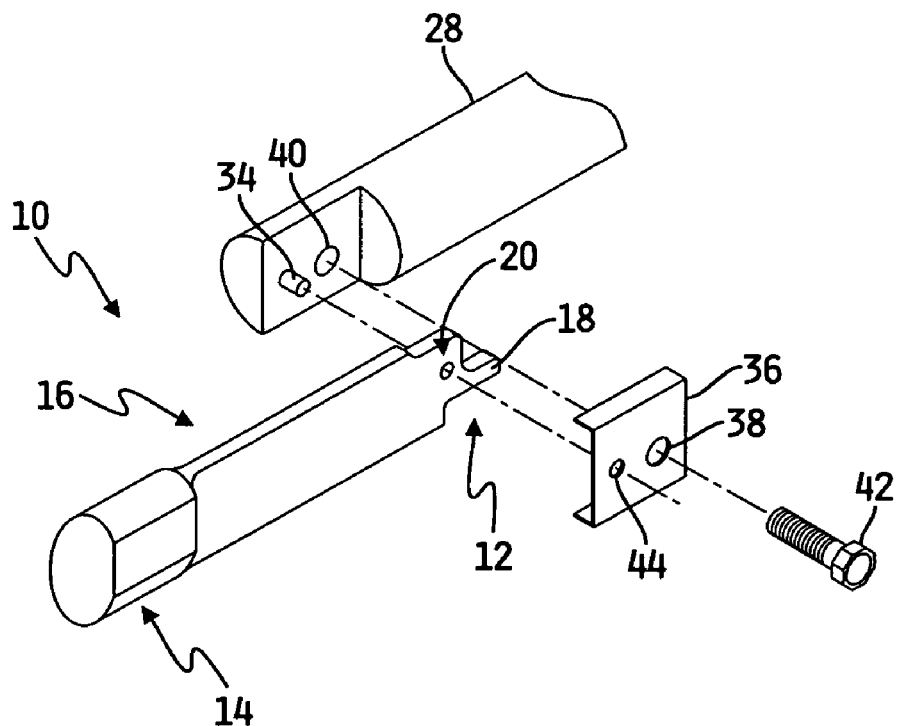
FIG. 7 is a side elevation view of an illustrative reciprocating saw having the adaptor of FIG. 1 coupled thereto.
Figure 8:
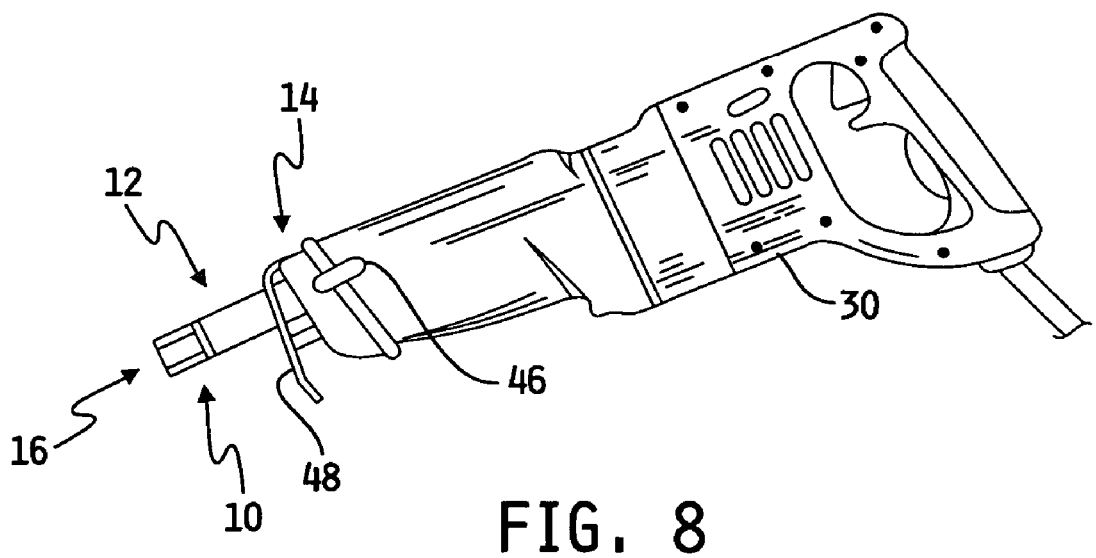
FIG. 8 is an exploded perspective view of the adaptor of FIG. 1 and a reciprocating saw blade receiver of the reciprocating saw of FIG. 7.

In use, the adaptor 10 is coupled with a reciprocating shaft 28 of a reciprocating saw 30 as illustrated in FIGS. 7 and 8. The adaptor 10 is coupled to the shaft 28 using a mounting method similar to the mounting method used to couple a reciprocating saw blade to the shaft 28. To do so, the first end 12 of adaptor 10 is coupled with a reciprocating saw blade receiver 32 of the shaft 28. The aperture 20 of the first end 12 receives a guide pin 34 of the receiver 32. To secure the first end of the adaptor 10 to the shaft 28, a clamp 36 is positioned over the first end 12 of the adaptor 20 and secured to the receiver 32. The clamp 36 includes an aperture 38 that is aligned with a threaded aperture 40 of the receiver 32 when the clamp 36 is so positioned. To secure the clamp 36 to the receiver 32, a securing device 42 such as a bolt, screw, or other type of securing device is screwed or otherwise mounted through the aperture 38 of the clamp 36 and into the aperture 40 of the receiver 32. The securing device 42 may be accessed through a window 46 of the saw 30. The clamp 36 may also include an aperture 38 for receiving a portion of the guide pin 32 when the clamp 36 is secured to the receiver 32. It should be understood, however, that the shaft 28, receiver 32, clamp 36 and securing device 42 are merely illustrative and that, in other embodiments, alternative configurations, devices, and methods may be used to couple the adaptor 10 to the reciprocating saw 30 depending on, for example, the make and model of the saw 30.

In some embodiments, the saw 30 may include a guard 48 as illustrated in FIG. 8. The guard 48 provides a stabilizing guide when the saw 30 is operated. When the adaptor 10 is coupled with the saw 30, the elongated portion 12 of the adaptor 10 traverses through the guard 48. Accordingly, the elongated portion 12 is configured to be able to be moved back and forth through the guard 48 when the saw 30 is used. The illustrative portion 12 has a substantially rectangular cross-section to allow the portion 12 to be reciprocated through the guard 48. However, the elongated portion 12 may have other cross-sectional shapes including, but not limited to, elliptical, triangular, diamond, polygonal, or any other shape or configuration allowing the portion 12 to be reciprocated through the guard 48. In some applications, the guard 48 may be removed form the saw 30. In such applications, the elongated portion 12 may have any geometrically shaped cross-section and may be of any size suitable for the saw 30.

In the illustrative embodiment, the first end 12, second end 14, and elongated portion 16 form a unitary construction. However, in other embodiments, one or both of the ends 12, 14 may be coupled or otherwise secured to the elongated portion 16 using, for example, securing devices such as screws, bolts, adhesives, and the like. The adaptor 10 may be made from any material being strong enough to be coupled with a tool and be reciprocated back and forth by the saw 30. Illustratively, the adaptor 10 is made from a metallic material. Additionally, the adaptor 10 may be of any size usable by the saw 30. Illustratively, the adaptor 10 has a length 15 of about four inches as illustrated in FIG. 1 and the elongated portion 16 has a width 13 of about 0.125 inches. However, the adaptor 10 may have any length and width that allows the adaptor 10 to be coupled with the saw 30 and to provide enough stability for a tool coupled to the adaptor during use of the saw 30.

Referring now to FIGS. 9-20, various embodiments of a tool 50 for use with the adaptor 10 and the saw 30 will be described. The tool 50 is configured to be coupled with the adaptor 10 to allow the tool 50 to be operated via the saw 30. Each tool 50 includes a coupler configured to couple with the adaptor 10. The tool 50 may also include a keyless chuck, support arm, bracket, and/or other structures and elements. Each tool 50 also includes a tool device such as, for example, a scrapping blade, a saw blade, a file, a cultivator, and/or other tool device. Accordingly, as used herein, the term "tool device" is intended to refer to any device capable of being used to perform a tool function such as, for example, cutting, sawing, filing, drilling, scrapping, cultivating, molding, sanding, smoothing, routing, rounding, trimming, or any other function generally associated with a tool. However, the various embodiments of the tool 50 so described are merely illustrative and it is contemplated that other types of tools having other elements, structures, configuration, and/or tool devices may be used. Additionally, although the tool 50 is generally illustrated and described as being a separate piece from the adaptor 10, it is contemplated that in alternative embodiments the tool 50 and the adaptor 10 may form a unitary construction, be secured together, or otherwise form a single adaptor tool for use with a reciprocating saw.

Referring now to FIGS. 9 and 8, in one embodiment, the tool 50 is embodied as a scrapper 52. The scrapper 52 includes a coupler 54 and a scrapper body 56. The coupler 54 is configured to couple with the second end 14 of the adaptor 10. In the illustrative embodiment, the coupler 54 includes an aperture (not shown) configured to receive the second end 14. For example, the aperture (not shown) may have an elliptical shape substantially similar to the cross-section of the second end 14. However, the aperture (not shown) of the coupler 54 may have any shape that is capable of receiving the second end 14. Alternatively, in embodiments in which the second end 14 includes a receiving aperture, the coupler 54 may include a corresponding protrusion configured to be received by the aperture of the second end 14. Regardless, the second end 14 of the adapter 10 and the coupler 54 of the scrapper 52 are configured to be coupled together.

The coupler 54 also includes an threaded aperture 58 for receiving a securing device 60. Illustratively, the securing device 60 is a thumb screw. However, the securing device 60 may be any type of securing device capable of being received by the aperture 58 such as a set screw, bolt, or the like. The securing device 60 is used to secure the coupler 54 to the first end 14 of the adaptor 10. To do so, the securing device 60 is threaded into the aperture 58 until an end of the device 60 contacts the surface 22 of the first end 14 and applies adequate pressure to the surface 22 to secure the coupler 58 with the adaptor 10. To separate the scrapper 52 from the adaptor 10, the securing device 60 is unthreaded from the aperture 58. In other embodiments, the coupler 54 may include other devices and configurations for coupling the scrapper 52 (i.e. the tool 50) to the adaptor 10. For example, the coupler 54 may include an internal aperture configured to receive a detent 24 located on the first end 14 of the adaptor 10 as illustrated in FIG. 5. Alternatively, the coupler 54 may include one or more slots configured to receive a protrusion 26 located on the first end 14 as illustrated in FIG. 6.

The scrapper body 56 is attached to the coupler 54. The scrapper body 56 may be attached using any suitable securing devices such as adhesives, a number of welds, screws, bolt and nuts, and the like. Alternatively, the scrapper body 56 and the coupler 54 may form a unitary construction. The scrapper body 56 includes a mount portion 62 configured to receive a scrapper blade 64. The blade 64 is substantially flat and has a substantially rectangular top profile. Additionally, the blade 64 includes at least one sharpened edge 76 and a number of apertures 72. The blade 64 may be coupled to the portion 62 via cooperation of threaded inserts 66 and bolts 68. To do so, the threaded inserts 66 are threaded into a number of threaded apertures 70 of the scrapper body 56. The threaded inserts 66 include internal threads for receiving the bolts 68. The blade 64 is positioned on the mount portion 62 so that the apertures 72 are aligned with the apertures 70 of the scraper body 56 and so that one of the edges 76 is positioned outward. The bolts 68 are subsequently threaded through the apertures 72 of the blade 64 and into the threaded inserts 66 to secure the blade 64 to the scrapper body 56. Additionally, a set of washers 74 may be used. After repeated use, the edge 76 of the blade 64 being used may become dull. The blade 64 may be replaced with a new blade 64 or, if the blade 64 includes additional sharpened edges 76, the blade 64 may be removed from and re-coupled to the scrapper portion in a position in which a new sharpened edge 76 is positioned outward.

The coupler 54, scrapper body 56, and blade 64 may be made from any material having enough strength to withstand the operation of the scrapper 52 by the saw 30. Illustratively, the coupler 54, scrapper body 56, and blade 64 are made of a metallic material. In some embodiments, the blade 64 may have other configurations. For example, the edges 76 of the blade 64 may curve downwardly. Additionally, the blade 64 may be coupled to the scrapper body 56 using alternative methods and devices. For example, the scrapper body 56 may include threaded posts that are received through the apertures 72 of the blade 64 when the blade is mounted on the mount portion 62. A set of wing nuts or the like may then be used to secure the blade 64 to the scrapper body 56. Alternatively, the apertures 70 of the scrapper body may be threaded.

Figure 11:
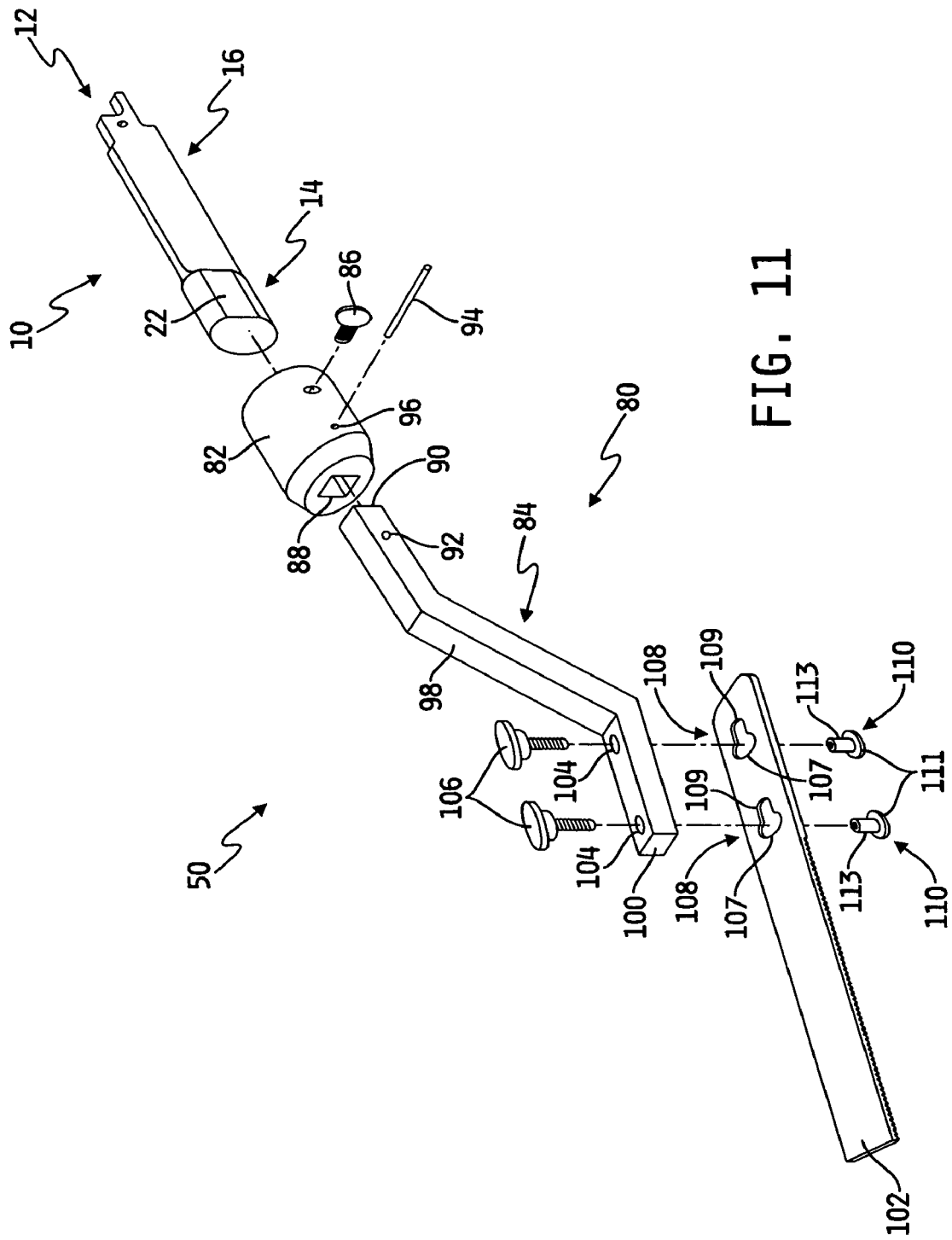
FIG. 11 is an exploded perspective view of the adaptor of FIG. 1 and a saw tool configured to be coupled with the adaptor.
Figure 12:
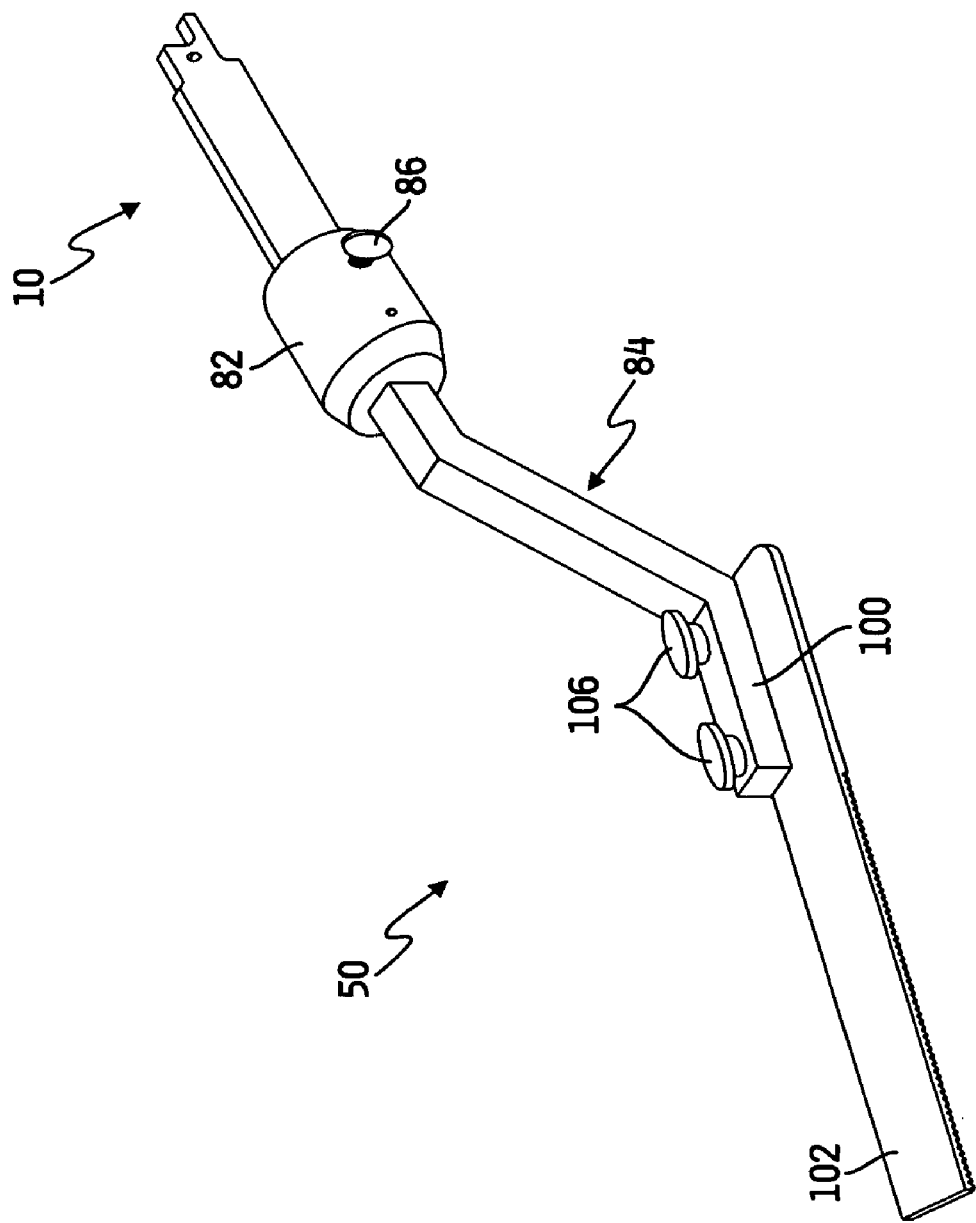
FIG. 12 is a perspective view of the saw tool of FIG. 11 coupled with the adaptor of FIG. 1.

Referring now to FIGS. 11 and 12, in another embodiment, the tool 50 is embodied as a saw 80. The saw 80 includes a coupler 82 and a bracket 84. The coupler 82 is substantially similar to the coupler 54 illustrated and described in regard to FIGS. 9 and 10. Accordingly, the description of the features of the coupler 54 are applicable to the coupler 82. For example, the coupler 82 includes a securing device 86 that is substantially similar to the securing device 60 and is usable to secure the saw 80 to the adaptor 10 as described above in regard to FIGS. 9 and 10.

The bracket 84 is attached to the coupler 82. The bracket 84 and coupler 82 may be attached using any suitable securing device such as glue, welds, screws, bolt and nuts, and the like. For example, the illustrative coupler 82 includes an aperture 88 configured to receive an end 90 of the bracket 84. The aperture 88 is shaped similar to the cross-section of the bracket. In the embodiment illustrated in FIGS. 11 and 12, the bracket 84 has a rectangular cross-section. However, in other embodiments, the bracket 84 may have any geometrical cross-section including, for example, elliptical, round, and polygonal cross-sections. Once the bracket 84 is received by the coupler 82, a pin 94 is inserted through a pin receiving aperture 96 of the coupler 82 and a pin receiving aperture 92 of the bracket 84 to secure the bracket 84 to the coupler 82. In alternative embodiments, the bracket 84 and coupler 82 may form a unitary construction.

The bracket 84 includes a middle elongated portion 98 that extends at an angle from the coupler 82 to provide clearance for the saw 80 to cut or otherwise be operated on a substantially level plane apart from a plane defined by the saw 30. The portion 98 may extend at any angle allowing the saw 80 to be operated by the saw 30. In particular, the portion 98 may extend at any angle between about 0 degrees to about 90 degrees. In one particular embodiment, the portion 98 extends at about a 45 degree angle from a longitudinal axis defined by the coupler 82 and the adaptor 10. However, in other embodiments, The bracket 84 includes a mount portion 100 to which a tool device is mounted. For example, a saw blade 102 may be mounted to the mount portion 100. As illustrated in FIG. 11, the bracket 84 may include apertures 104 vertically defined in the mount portion 100 for securing the saw blade 102 to the mount portion 100.

To do so, bolts 106, illustratively knob screws, are inserted through the apertures 104. Nuts 110, illustratively tee nuts, are threaded onto the portions of the bolts 106 that extend through the apertures 104 to a non-tightened position. The saw blade 102 includes a number of keyhole slots 108 having a circular portion 107 and an elongated portion 109. The circular portions 107 of the slots 108 are configured to allow the slots 108 to slip over a head portion 111 of the nuts 110 while the nuts 110 are loosely coupled to the bolts 106. The saw blade 102 may then be slid or otherwise moved to a forward position. In doing so, portions of elongated shafts 113 of the nuts 110 are positioned in the elongated portions 119 of the slots 108. Once the saw blade 102 is so positioned, the bolts 106 and nuts 110 may be tightened to secure the saw blade 102 to the bracket 84. Although the bolts 106 and nuts 110 are illustrated as knob screws and tee nuts, respectively, other types of bolts and nuts may be used. Additionally, the bolts 106 and nuts 110 may be embodied as any type of securing devices configured to cooperate to secure the saw blade 102 to the bracket 84. Further, the saw blade 102 may be secured to the bracket 84 using other types of securing devices such as screws, clamps, ties, and the like.

In alternative embodiments, the bracket 84 may include a number of threaded posts to receive the saw blade 102 and configured to cooperate with a number of nuts to secure the blade 102 to the bracket. The saw blade 102 may be any type of saw blade including, but not limited to, a wood saw blade, a metal saw blade, or a combination saw blade. The saw blade 102 may be sharpened on one or more sides to facilitate sawing in both the left and right directions and/or to extend the use life of the saw blade 102. Further, in other alternative embodiments, the saw blade 102 and the bracket 84 form a unitary construction.

Figure 13:
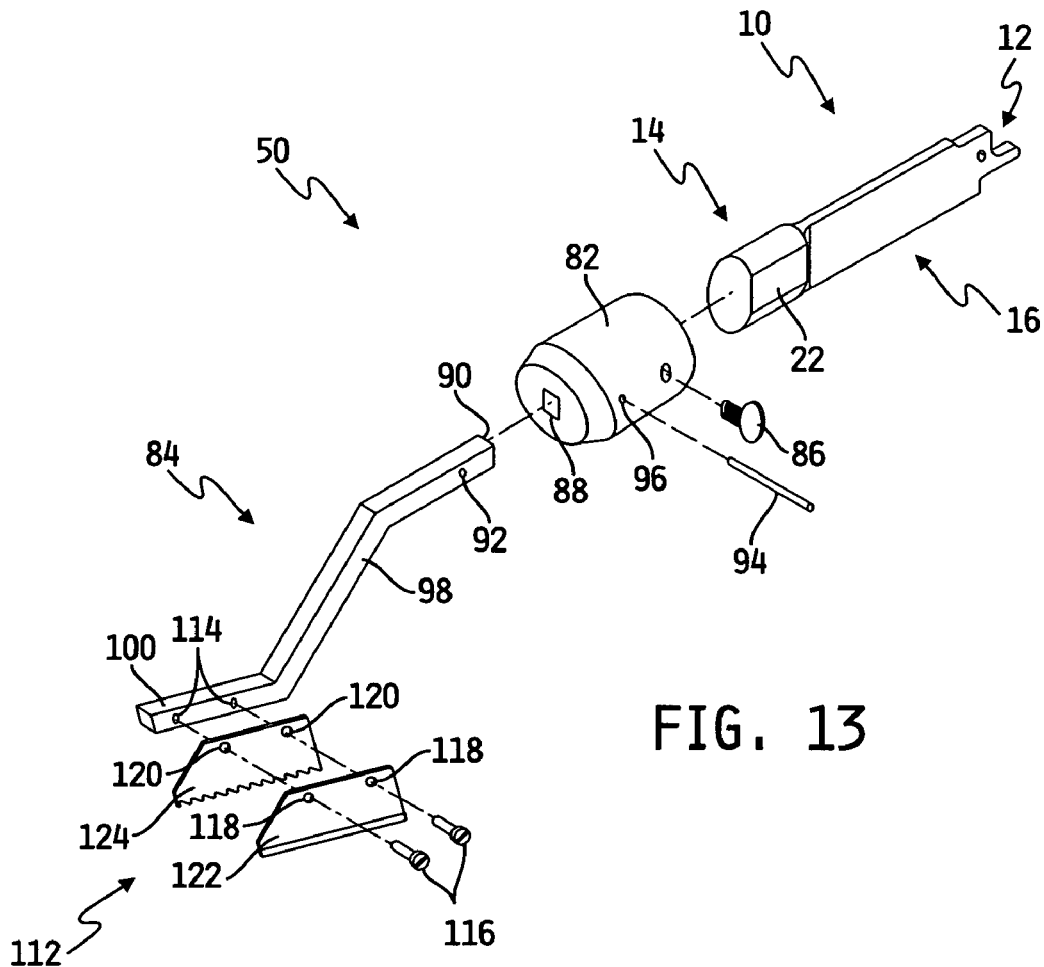
FIG. 13 is an exploded perspective view of the adaptor of FIG. 1 and a grout saw tool configured to be coupled with the adaptor.
Figure 14:
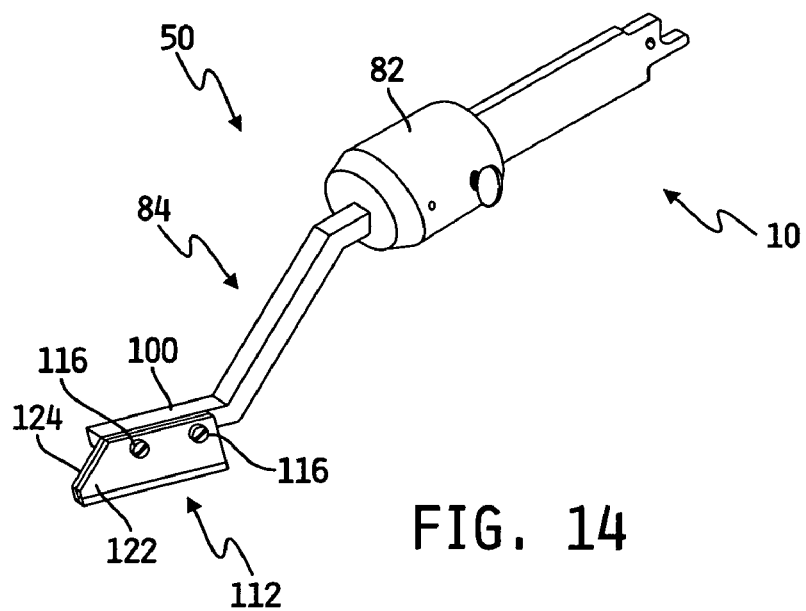
FIG. 14 is a perspective view of the grout saw tool of FIG. 13 coupled with the adaptor of FIG. 1.

In an additional embodiment, a grout saw 112 may be mounted to the mount portion 100 of the bracket 84. For example, as illustrated in FIGS. 13 and 14, the bracket 84 may include threaded apertures 114 horizontally defined in the mount portion 100 for securing the grout saw 112 to the mount portion 100. To do so, securing devices 116, such as screws, bolts, thumbscrews or the like, are inserted through mounting apertures 118 and 120 of grout saw blades 122, 124, respectively, and threaded into the apertures 114. The securing devices 116 may be embodied as any type of securing devices capable of securing the blades 122, 124 to the mount portion 100. Additionally, other methods and devices may be used to secure the blades 112, 124 to the mount portion 100 such as clamps, ties, wing nuts, and the like. Alternatively, the grout saw 112 and the bracket 112 may form a unitary construction. Additionally, other types of saw blades may be used, such as wood and/or metal blades, that are configured to be mounted to the mount portion 100.

Figure 15:
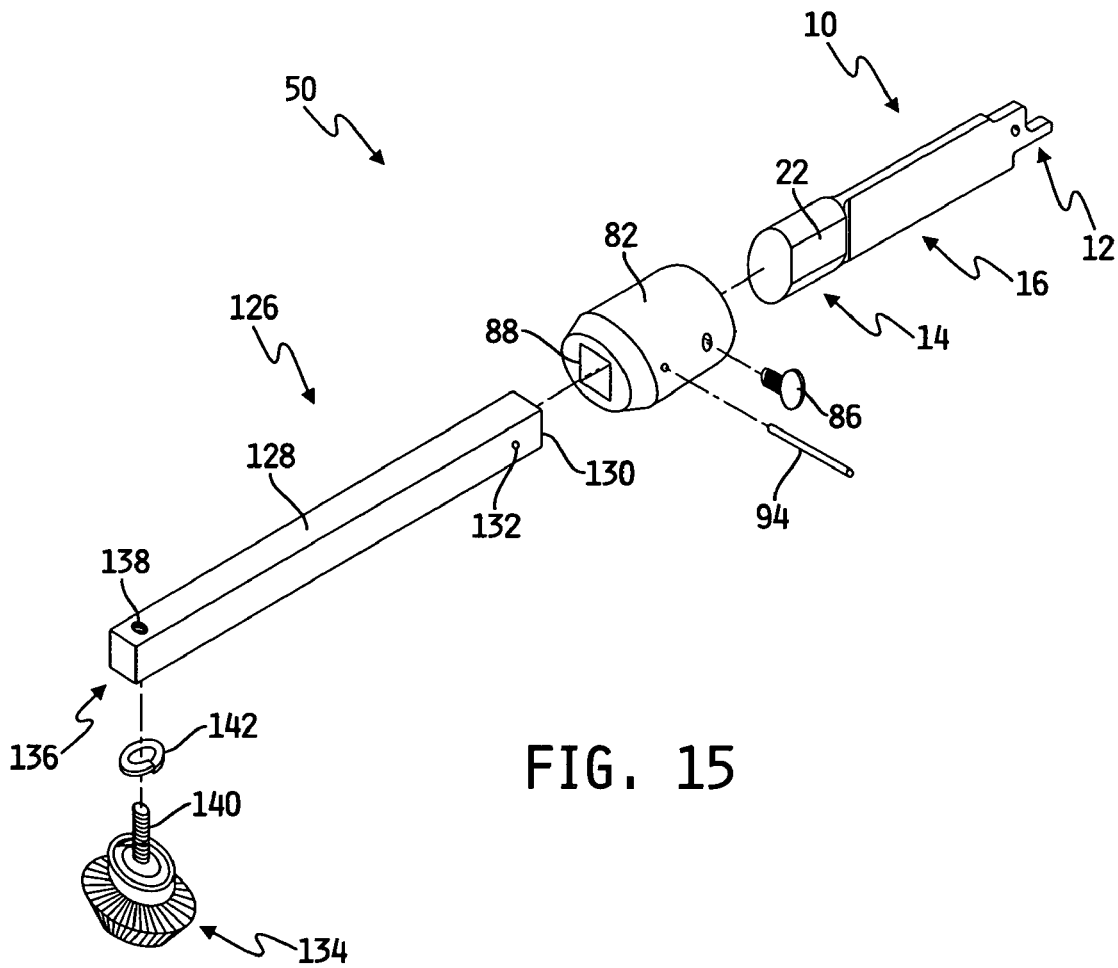
FIG. 15 is an exploded perspective view of the adaptor of FIG. 1 and a brush tool configured to be coupled with the adaptor.
Figure 16:
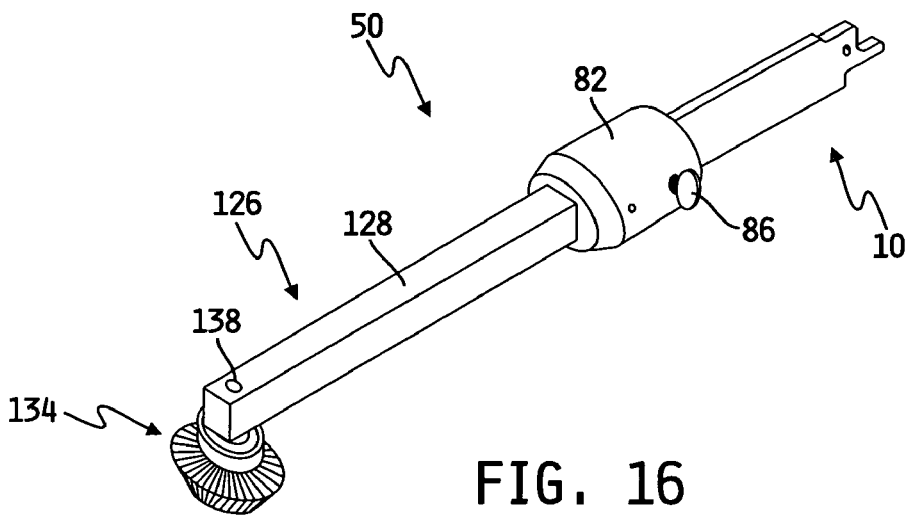
FIG. 16 is a perspective view of the brush tool of FIG. 15 coupled with the adaptor of FIG. 1.

Referring now to FIGS. 15 and 16, in a further embodiment, the tool 50 may be embodied as a brush 126. The brush 126 includes a bracket 128 attached to a coupler 82. The coupler 82 is similar to the coupler 82 described above in regard to FIGS. 11-14 and like illustration numbers are used. Additionally, the bracket 128 is attached to the coupler 82 in a manner similar to the bracket 84 described above in regard to FIGS. 11-14. For example, an end 130 of the bracket 82 is received by the aperture 88 of the coupler 82. The pin 94 is inserted through the aperture 96 of the coupler 82 and a pin receiving aperture 132 of the bracket 128 to secure the bracket 128 to the coupler 82. However, other attachment methods and devices may be used. For example, the bracket 128 and coupler 82 may be attached via a number of welds, nuts and bolts, screws, clamps, adhesives, or the like. Alternatively, the bracket 128 and coupler 82 may form a unitary construction.

A brush head 134 is mounted to a mount portion 136 of the bracket 128. The mount portion 136 includes a threaded aperture 138. The brush head 134 includes a bolt 140 which is threaded into the aperture 138 to secure the brush head 134 to the bracket 128. A washer 140 may also be used. In other embodiments, other methods and devices may be used to mount the brush head 134 to the bracket 128. For example, the brush head 134 may be mounted to the bracket using nuts and bolts, screws, clamps, or other securing devices capable of securing the brush head 134 to the bracket 128. Alternatively, the brush head 134 and the bracket 128 may form a unitary construction. The brush head 134 may be any type of brush including, but not limited to, a wire brush, a stiff bristle cleaning brush, or the like. Additionally, the bush head 134 may be formed from a solid brush head such as a sanding head or the like. The bracket 128 may be substantially straight as illustrated in FIGS. 15 and 16 or may be extend from the coupler 82 at an angle of about 0 degrees to about 90 degrees similar to the bracket 84 illustrated and described above in regard to FIGS. 11-14.

Figure 17:
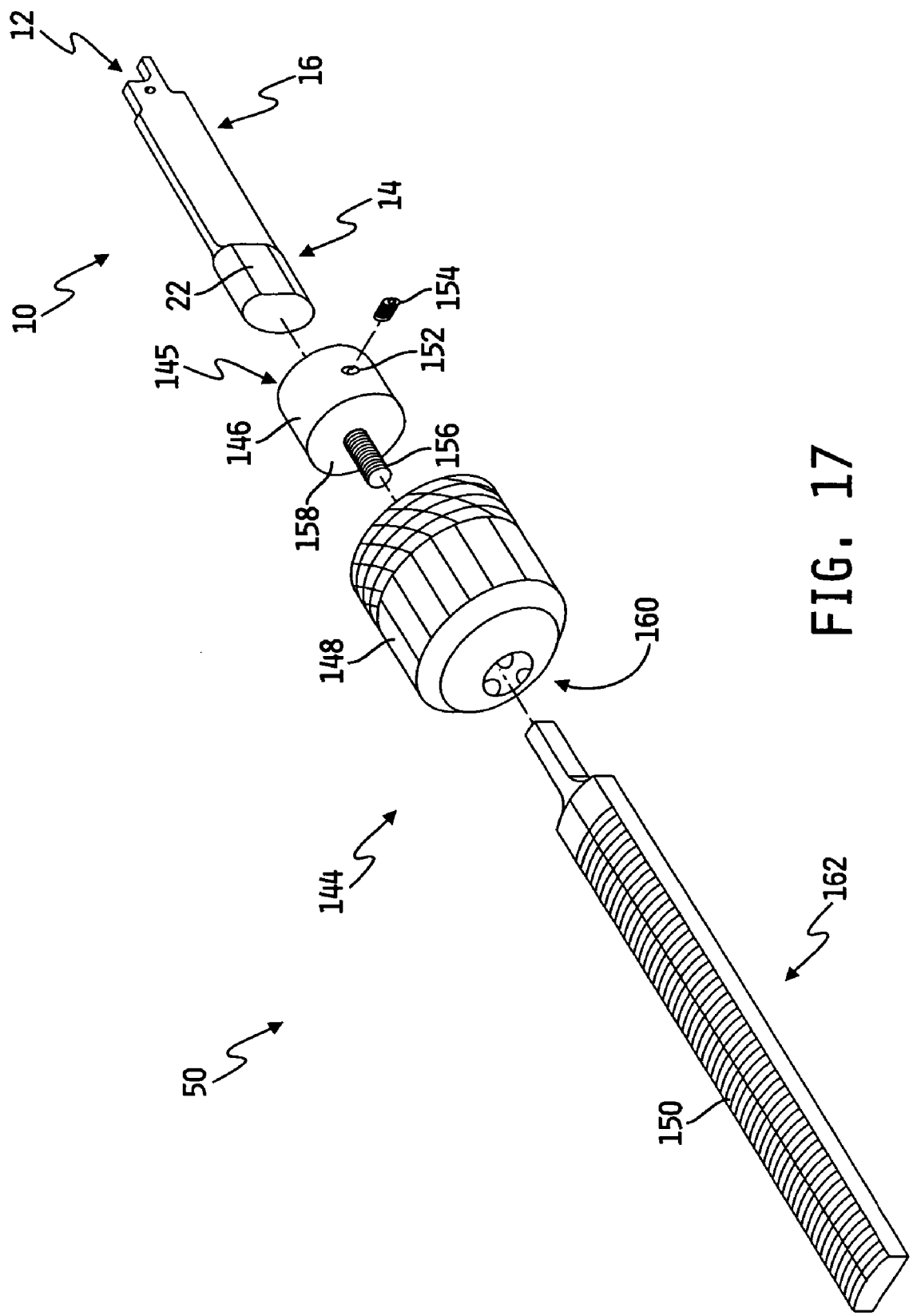
FIG. 17 is an exploded perspective view of the adaptor of FIG. 1 and a file tool configured to be coupled with the adaptor and having a keyless chuck.
Figure 18:
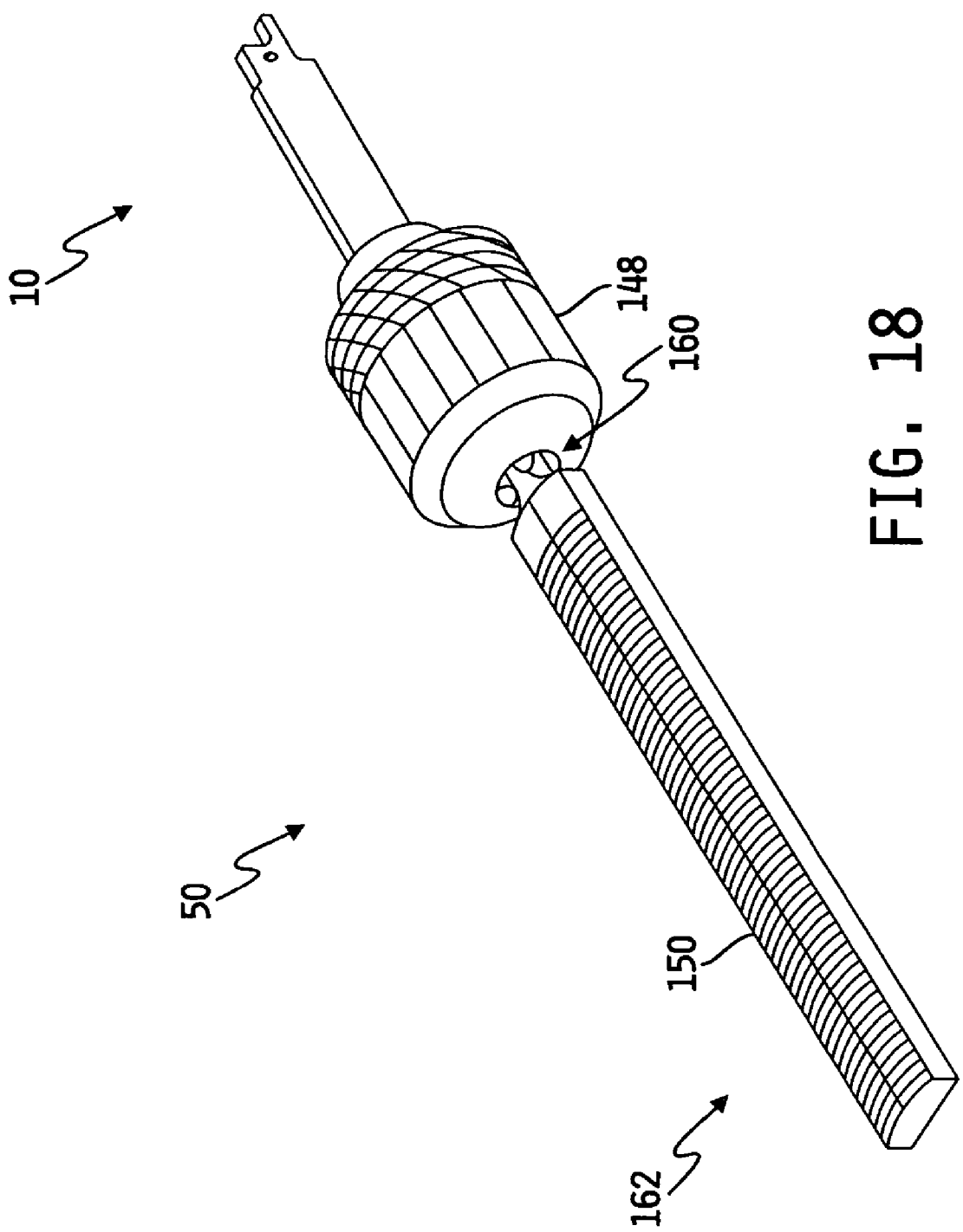
FIG. 18 is a perspective view of the file tool of FIG. 17 coupled with the adaptor of FIG. 1.

Referring now to FIGS. 17 and 18, in a further embodiment, the tool 50 is a file 144. The file 144 includes a coupler 146, a keyless chuck 148, and a file 150. The coupler 146 is configured to couple with the second end 14 of the adaptor 10. The coupler 146 is similar to the coupler 84 and the description of the coupler 84 above in regard to FIGS. 11-16 is applicable to coupler 146. The illustrative coupler 146 has an aperture (not shown) on a first side 145. The aperture (not shown) is configured to receive the second end 14 of the adaptor 10. The coupler 146 also has a threaded aperture 152 for receiving a securing device 154. Illustratively, the securing device 154 is a set screw, but other types of securing devices may be used such as thumb screws, bolts, and the like may be used. The securing device 154 is used to secure the coupler 146 to the first end 14 in a manner similar to the coupler 84 and securing device 154 described above in regard to FIGS. 11 and 12. For example, the securing device 154 is threaded into the aperture 152 until an end of the device 86 contacts the surface 22 of the first end 14 of the adaptor 10 and applies adequate pressure to the surface 22 to secure the coupler 146 to the adaptor 10. In alternative embodiments, other devices and configurations may be used to coupler the coupler 146 to the adaptor 10. For example, the coupler 146 may be coupled to the adaptor 10 via adhesives, pressure fitting, clamps, or the like. Additionally, in some embodiments, the coupler 146 and the adaptor 10 may form a unitary construction.

Figure 19:
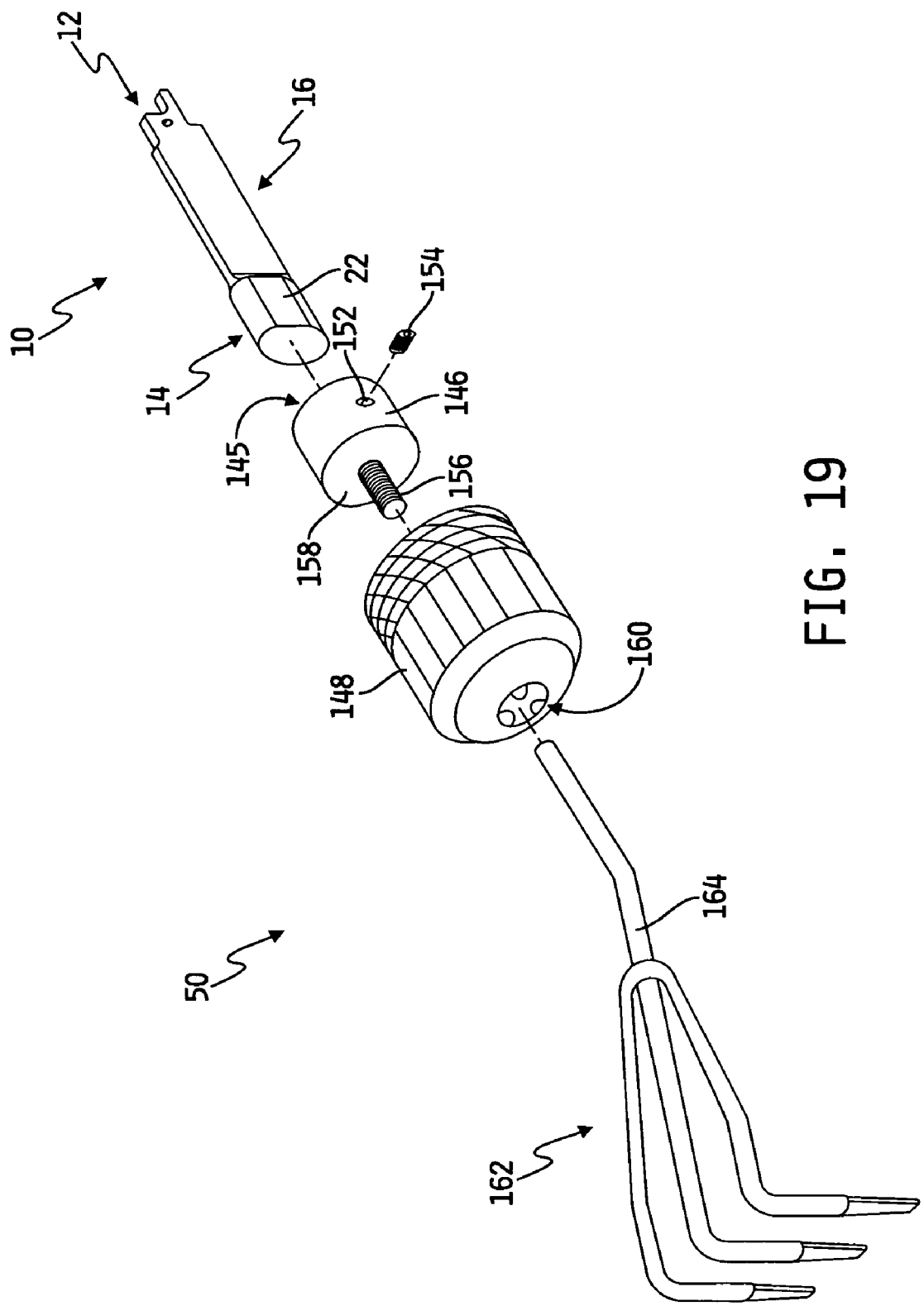
FIG. 19 is an exploded perspective view of the adaptor of FIG. 1 and a cultivating tool configured to be coupled with the adaptor of FIG. 1 and having a keyless chuck.
Figure 20:
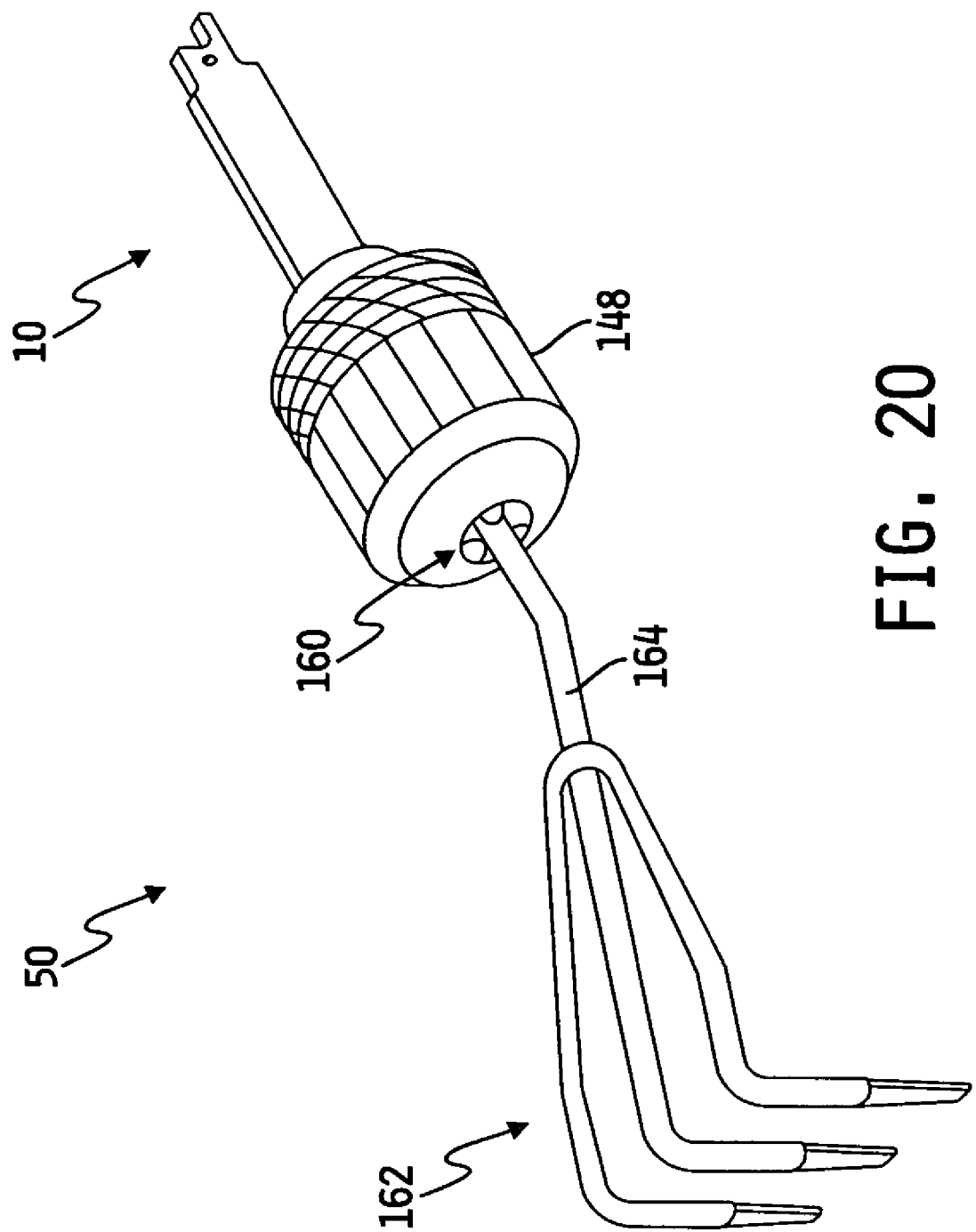
FIG. 20 is a perspective view of the cultivating tool of FIG. 19 coupled with the adaptor of FIG. 1.
Figure 21:
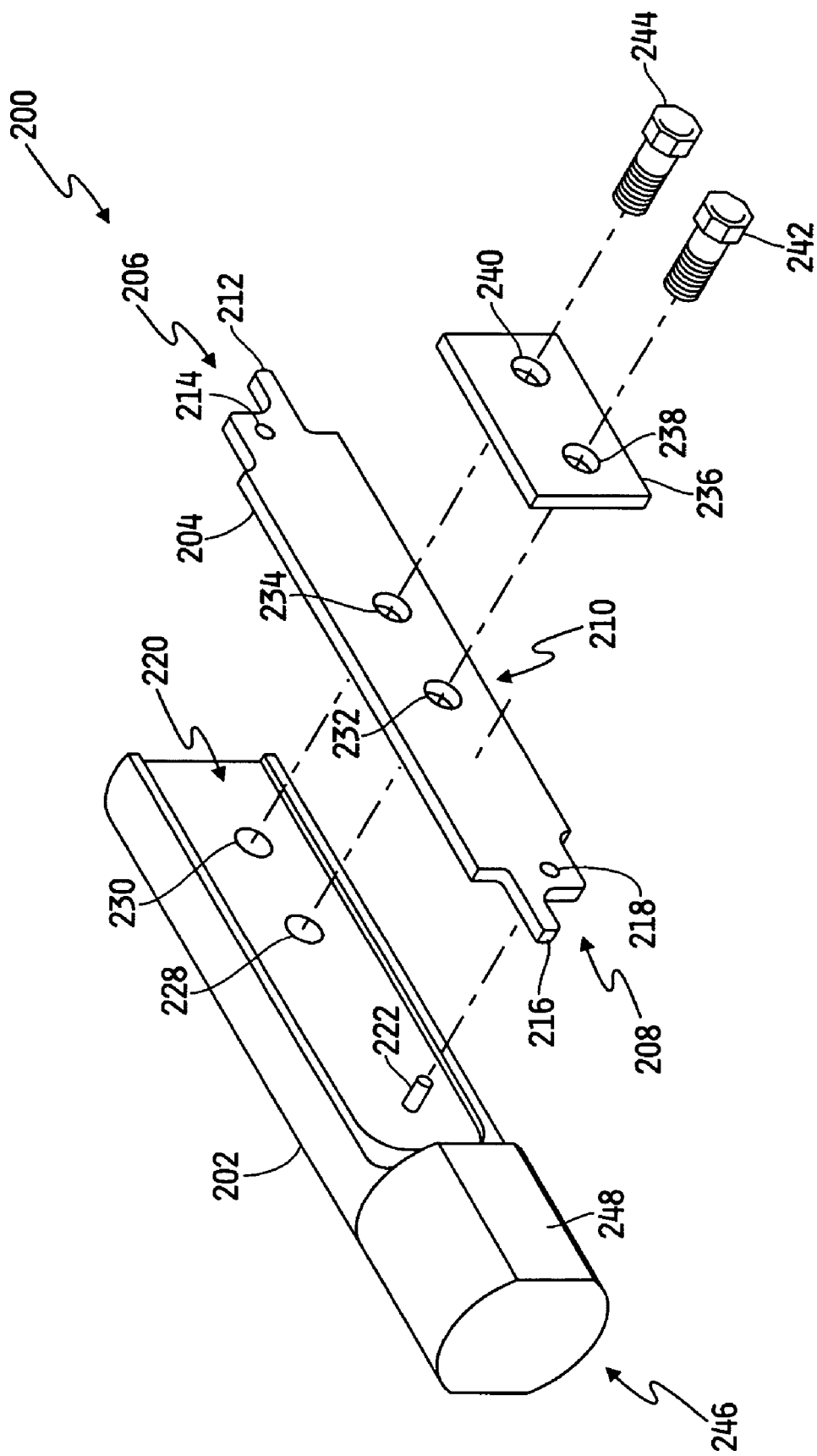
FIG. 21 is an exploded perspective view of another embodiment of a tool adaptor for use with a reciprocating saw.

A threaded post 156 extends from a side 158 opposite the side 145 of the coupler 146. The keyless chuck 148 includes coupling devices (not shown) to allow the chuck 148 to be threaded onto the post 156. Once the chuck 148 is coupled to the coupler 146, the chuck 148 may be operated in a normal manner to cause a clamp 160 of the chuck 148 to open or close. While in the open position, a tool device 162 may be inserted into the clamp 160. The chuck 148 may then be operated in a normal manner to close the clamp 160 and secure the tool device 162 to the chuck 148 and adaptor 10. The tool device 162 may be any type of tool device having a mounting portion capable of being inserted into the clamp 160 and subsequently secured by the clamp 160. The mounting portion of the tool device may have a round, square, polygonal, or other cross-sectional shape. In one particular embodiment, the tool device is a file 150 as illustrated in FIGS. 17 and 18. In another embodiment, the tool device is a cultivator 164 as illustrated in FIGS. 19 and 20. However, it is contemplated that any tool or tool device may be coupled with the keyless chuck 148 including, but not limited to, a file, a cultivator, a saw, a scrapper, a brush, a drill bit, a router bit, or any other tool or tool device having a portion capable of being coupled with the clamp 160 of the keyless chuck 148.

In use, the adaptor 10 is coupled with the saw 30 as described above in regard to FIGS. 7 and 8. The coupler 146 is coupled with the adaptor 10 and the keyless chuck 148 is threaded or otherwise coupled with the coupler 146. The tool device 162 is subsequently inserted into the clamp 160 of the chuck 148 and the chuck 148 is operated to cause the clamp 160 to close and couple the device 162 to chuck 148 and adaptor 10. Once the device 162 is secured to the adaptor 10, the saw 30 may be operated to cause the tool device 162 to be reciprocated in a back and forth motion as described above in regard to FIGS. 7 and 8.

The tool 50 may be made from any suitable material that is capable of being reciprocated back and forth during operation of the saw 30. For example, the couplers 54, 82, 146, scrapper body 56, and brackets 84, 128 may be made from a metallic or plastic material.

Referring now to FIGS. 21-24, in another embodiment, an adaptor 200 includes a replaceable adaptor member or tang 204 and a tool adaptor member 202. The replaceable tang 204 includes opposing ends 206 and 208, and an elongated portion 210 defined between the opposing ends 206 and 208. Similar to the first end 12 of the tool adaptor 10 described above and illustrated in FIGS. 1-4, the opposing first and second ends 206, 208 of the adaptor 200 are configured to be received by a reciprocating saw. For example, the opposing first and second ends 206, 208 may be similar to a mounting end of a typical reciprocating saw blade commonly used with the reciprocating saw. It will be appreciated that the opposing ends 206, 208 may also be configured for use with other suitable non-reciprocating tools. The illustrative first opposing end 206 includes a protrusion 212 that extends longitudinally relative to the elongated portion 210 and an aperture 214 configured to receive a guide pin of the reciprocating saw when the adaptor is coupled to the reciprocating saw. Similarly, the illustrative opposing second end 208 includes a protrusion 216 that extends longitudinally relative to the elongated portion 210 and an aperture 218 configured to receive a guide pin of the reciprocating saw when the adaptor is coupled to the reciprocating saw. As such, it should be appreciated that the configuration of the first and second opposing ends may but need not be substantially identical and interchangeable and that either of the first and second opposing ends 206, 208 may be coupled with a reciprocating saw receiver. As such, in other embodiments, the first and second ends 206, 208 may have other configurations and/or elements based on the type, model, and other criteria related to the reciprocating saw, or other suitable tool, to which the adaptor 200 is to be coupled. It will further be appreciated that the opposing ends 206, 208 may be identical in shape, but mirror images in orientation.

The replaceable tang 204 is configured to be coupled with the tool adaptor 202. To do so, the tool adaptor 202 includes a recessed area 220 configured to receive a portion of the tang 204. The tool adaptor 202 includes a guide pin 222 extending outwardly from the recessed area 220. The aperture 214, 218 of the tang 204 are configured to receive the guide pin 222 while the respective end 206, 208 of the tang 204 is coupled to the adaptor 202. That is, the replaceable tang 204 may be coupled to the adaptor with the first end 206 extending outwardly from the adaptor 202 or with the second end 208 extending outwardly from the adaptor 202. When the tang 204 is coupled to the adaptor 202 such that the first end 206 extends outwardly from the adaptor 202, the guide pin 222 is received by the aperture 218 of the second end 208. Conversely, when the tang 204 is coupled to the adaptor 202 such that the second end 208 extends outwardly from the adaptor 202, the guide pin 222 is received by the aperture 214 of the first end 206.

The replaceable tang 204 may be secured to the tool adaptor 202 via the use of screws 242, 244. To do so, the tool adaptor 202 includes threaded apertures 228, 230. The replaceable tang 204 includes apertures 232, 234, which are aligned with the apertures 228, 230 when the tang 204 is to be coupled to the tool adaptor 202. Additionally, a clamp 236 may be used to secure the tang 204 to the tool adaptor 202. The clamp 236 includes apertures 238, 240, which are aligned with apertures 232, 234 and apertures 228, 230 when the tang 204 is to be coupled to the tool adaptor. The screws 242, 244 are used to couple and secure the clamp 236, tang 204, and tool adaptor 202 by inserting the screws 242, 244 through the apertures 238, 240 of the clamp 236, through the apertures 232, 234, and threading the screws 242, 244 into the apertures 228, 230. In some embodiments, the screws 242, 244 may be quick release screws such as, for example, for example, thumb screws or the like.

The tool adaptor 202 includes a mounting end 246, which is similar to the second end 14 of the adaptor 10 described above in regard to FIGS. 1-4. For example, the mounting end 246 is configured to couple with a tool such as a scraper, file, saw, brush, cultivator, or any other type of tool generally operated with a reciprocating motion and configured to be coupled with the mounting end 246. The illustrative mounting end 246 has a substantially elliptical cross-section as illustrated in FIG. 24. In one particular embodiment, the mounting end 246 has a substantially circular cross-section. However, in other embodiments, the mounting end 246 may have any other cross-sectional shape including, but not limited to, an ovate, square, round, triangular, diamond, polygonal, and any other geometrical or other shape allowing the adaptor to be coupled with the tool. The mounting end 246 of the tool adaptor 202 illustrated in FIGS. 21-24 includes a securing surface 248. The securing surface 248 is configured to be contacted by a coupling or securing device, such as a screw, bolt, or other type of securing device, of the tool to secure the tool to the adaptor 200 (i.e., to the tool adaptor 202). In other embodiments, the mounting end 246 may include other elements, configurations, or devices for coupling or securing together the tool adaptor 202 and the tool. For example, in some embodiments, the mounting end 246 may include a receiving aperture for receiving a portion of the tool and securing devices to secure or couple together the adaptor and the tool, a biased detent, a protrusion or guide pin, or other securing or coupling device as discussed above in regard to FIGS. 5 and 6.

In use, the replaceable tang 204 is coupled together with the tool adaptor 202 via the clamp 236 and/or screws 242, 244. The tang 204 may be coupled together with the tool adaptor 202 in any orientation. That is, the tang may be coupled together with the tool adaptor 202 with first opposing end 206 or second opposing end 208 extending from the tool adaptor 202. The opposing end 206, 208 extending from the tool adaptor 202 may then be coupled together with a reciprocating shaft of a reciprocating saw, or other suitable tool, in a manner similar to the tool adaptor 10 illustrated in and described above in regard to FIGS. 7 and 8. In this way, the adaptor 200 is coupled with a reciprocating saw. A tool, such as a scraper, file, saw, brush, cultivator, or other tool, may then be coupled with the mounting end 246 of the tool adaptor 202. During use of the reciprocating saw and adaptor 200, the tang 204 may become damaged or break due to stress, operator error, wear-and-tear or the like. If the tang 204 does break during use, the adaptor 200 may be decoupled from the reciprocating saw and the tang 204 may be decoupled from the tool adaptor 202. The tang 204 may then be reversed and remounted to the tool adaptor such that the opposite end 206, 208 is extending from the tool adaptor 202. The adaptor 200 may then be recoupled together with the reciprocating saw. In the event that the opposing ends 206, 208 are substantially similar, the life of the tang is extended. In the event that the opposing ends 206, 208 are of different size, shape or configuration, one opposing end may be used with one tool and the other opposing end with a different tool.

Figure 25:
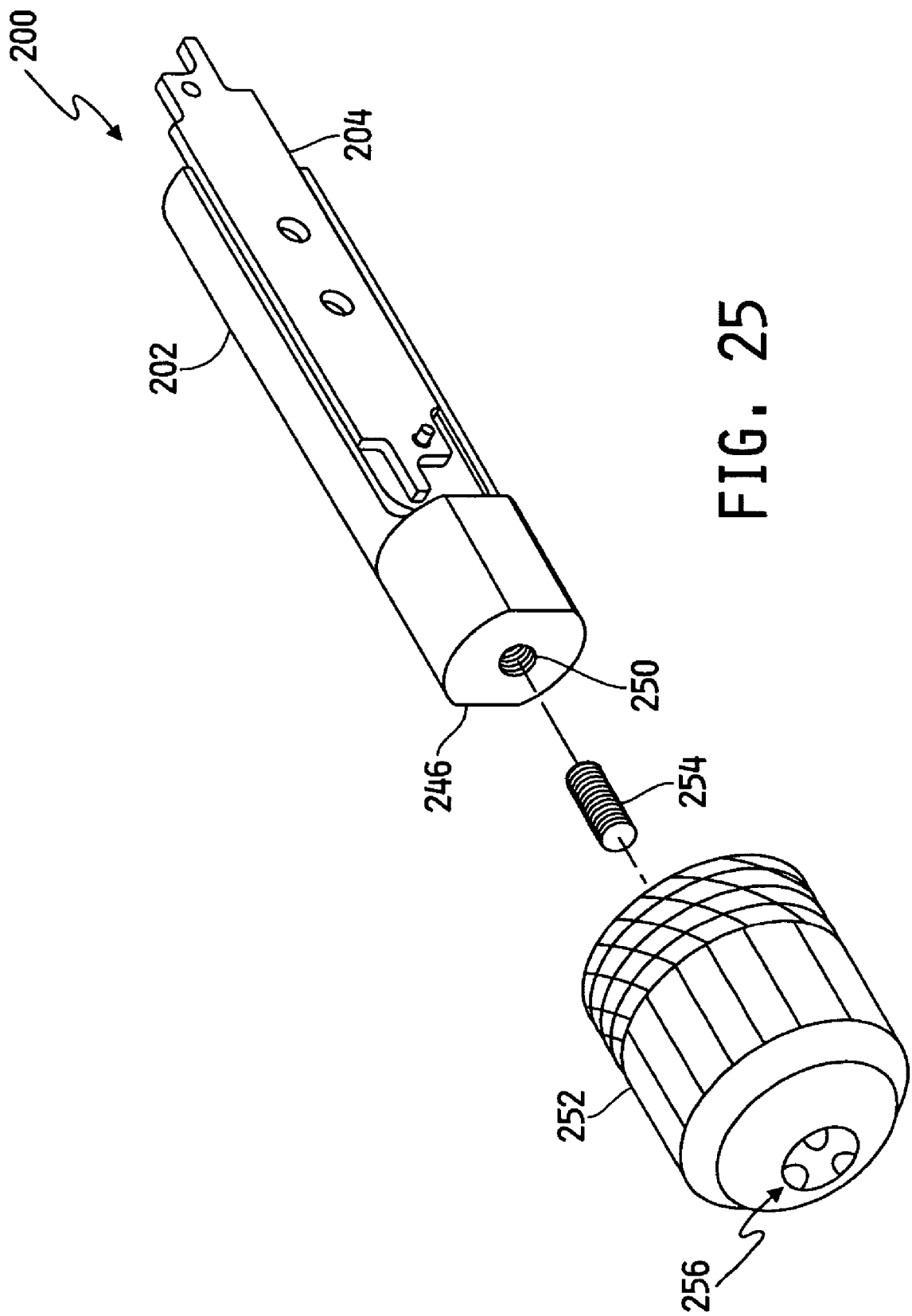
FIG. 25 is an exploded perspective view of a tool adaptor similar to the tool adaptor of FIG. 21.

Referring now to FIG. 25, in some embodiments, the mounting end 246 of the tool adaptor 202 may be configured to be coupled to a keyless chuck 252. In such embodiments, the mounting end 246 may include a threaded aperture 250. A threaded stud 254 may be threaded into the aperture 250 such that a portion of the threaded stud 254 extends from the mounting end 246. The keyless chuck 252 may then be threaded onto the extending portion of the threaded stud 254 in a manner similar to the keyless chuck 148 described above in regard to and illustrated in FIGS. 17 and 18. For example, the keyless chuck 252 includes a clamp 256 for securing a tool device to the keyless check 252 and adaptor 200. The keyless chuck 252 may then be operated in a normal manner to close the clamp 256 and secure the tool device to the chuck 252. The tool device may be any type of tool device having a mounting portion capable of being inserted into the clamp 256 and subsequently secured by the clamp 256. The mounting portion of the tool device may have a round, square, polygonal, or other cross-sectional shape. In one particular embodiment, the tool device is a file similar to file 150 illustrated in FIGS. 17 and 18. In another embodiment, the tool device is a cultivator similar to the cultivator 164 as illustrated in FIGS. 19 and 20. However, it is contemplated that any tool or tool device may be coupled with the keyless chuck 256 including, but not limited to, a file, a cultivator, a saw, a scrapper, a brush, a drill bit, a router bit, or any other tool or tool device having a portion capable of being coupled with the clamp 256 of the keyless chuck 252.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the tool adaptor and/or tool described herein. It will be noted that alternative embodiments of the tool adaptor and/or tool of the present disclosure may not include all of the features described yet still benefit from at least some of the advantages of such features. Those of ordinary skill in the art may readily devise their own implementations of the tool adaptor and/or tool that incorporate one or more of the features of the present invention and fall within the spirit and scope of the present disclosure as defined by the appended claims.

The invention claimed is:

1. A method for operating a reciprocating saw, the method comprising the steps of:

inserting a first adapter member through a guard of the reciprocating saw, the first adaptor member having opposing first and second ends, each opposing first and second end being configured to couple with the reciprocating saw blade receiver, the first end having a first receiver for a first connector coupling the first end to the saw, the first end tapering to a protrusion with a surface for underlying a second connector, the first end having a second receiver for a third connector, the first and second ends being a mirror image of each other;

coupling the first opposing end of the first adaptor member to a reciprocating saw blade receiver of the reciprocating saw;

coupling a second adaptor member with the first adaptor member; and coupling a tool to an end of the second adaptor member such that the end of the second adaptor member is received in an aperture of the tool.

2. The method of claim 1, wherein coupling the opposing end of the first adaptor member to the reciprocating saw blade receiver comprises coupling a first adaptor member having opposing ends, each opposing end configured to couple with the reciprocating saw.

3. The method of claim 1, wherein coupling the second adaptor member with the first adaptor member comprises receiving a portion of the first adaptor member in a recessed area of the second adaptor member.

4. The method of claim 1, wherein coupling the tool to the end of the second adaptor comprises coupling a tool selected from the group consisting of a scraper, a saw, a grout saw, a wire brush, a file, and a cultivator.

5. The method of claim 1, further comprising actuating a power switch of the reciprocating saw.

6. The method of claim 1, wherein coupling a second adaptor member with the first adaptor member comprises coupling the second adaptor member with a second opposing end of the first adaptor.

7. The method of claim 1, further comprising the steps of: decoupling the first opposing end of the first adaptor member from the reciprocating saw blade receiver; and coupling a second opposing end of the first adaptor member to the reciprocating saw blade receiver.

8. The method of claim 7, further comprising the step of coupling the first opposing end of the first adaptor member to the second adaptor member.

9. An adaptor for use with a reciprocating saw, the adaptor comprising:

a first adaptor member having opposing first and second ends, each opposing first and second end shaped to be secured to a reciprocating saw blade receiver of the reciprocating saw; and a second adaptor member configured to couple with the first adaptor member and having a first end configured to be received in a corresponding aperture of a tool to couple the second adaptor with the tool, the first end of the first adaptor member having a first receiver for a first connector coupling the first end to the saw, the first end tapering to a protrusion with a surface for underlying a second connector, the first end having a second receiver for a third connector, the third connector securing the first adaptor member to the second adaptor member, and the second end of the first adaptor member having a third receiver for the first connector coupling the second end to the saw, the second end tapering to a protrusion with a surface for underlying the second connector, the second end having a fourth receiver for a connector securing the first adaptor member to a second adaptor member.

10. The adaptor of claim 9, wherein the first adaptor member includes an elongated portion defined between the opposing ends.

11. The adaptor of claim 10, wherein the elongated portion comprises a substantially rectangular cross-section.

12. The adaptor of claim 10, wherein the elongated portion is configured to be reciprocated through a guard of the reciprocating saw while the reciprocating saw is operated by a user.

13. The adaptor of claim 9, wherein the first receiver of the first adaptor member is an aperture configured to receive a guide pin of the reciprocating saw while coupled thereto.

14. The adaptor of claim 9, wherein the first end of the second adaptor member comprises at least one coupling surface configured to be contacted by a securing device of the tool to secure together the tool and the second adaptor member.

15. The adaptor of claim 9, wherein the tool comprises a tool device selected from the group consisting of a scraper, a saw, a grout saw, a wire brush, a file, and a cultivator.

16. The adaptor of claim 9, wherein the second adaptor member comprises a recessed area configured to receive the first adaptor member.

17. The adaptor of claim 9, wherein the second adaptor member comprises a guide pin and the first adaptor member comprises an aperture configured to receive the guide pin while the first adaptor is coupled with the second adaptor.

18. The adaptor of claim 9, further comprising a clamp for securing together the first adaptor and the second adaptor.

19. The adaptor of claim 9, wherein the first adaptor and the second adaptor are configured to be coupled together by a number of screws.

20. The adaptor of claim 9, wherein the opposing ends are mirror images of one another.

\* \* \* \* \*